(12) United States Patent
Kagaya

(10) Patent No.: US 9,190,030 B2
(45) Date of Patent: Nov. 17, 2015

(54) DISPLAY CONTROL APPARATUS AND DISPLAY CONTROL METHOD

(71) Applicant: CANON KABUSHIKI KAISHA, Tokyo (JP)

(72) Inventor: Naoto Kagaya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 2 days.

(21) Appl. No.: 14/206,691

(22) Filed: Mar. 12, 2014

(65) Prior Publication Data

US 2014/0192083 A1      Jul. 10, 2014

Related U.S. Application Data

(63) Continuation of application No. 12/482,137, filed on Jun. 10, 2009, now Pat. No. 8,704,849.

(30) Foreign Application Priority Data

Jul. 1, 2008    (JP) .................................. 2008-172645
Sep. 26, 2008   (JP) .................................. 2008-249129

(51) Int. Cl.
| | |
|---|---|
| *G09G 5/00* | (2006.01) |
| *G09G 5/38* | (2006.01) |
| *G06F 3/023* | (2006.01) |
| *G06F 3/0482* | (2013.01) |
| *G06F 3/0485* | (2013.01) |
| *G06F 3/0489* | (2013.01) |
| *G06F 17/30* | (2006.01) |
| *H04N 21/472* | (2011.01) |
| *H04N 21/234* | (2011.01) |
| *G06F 3/0484* | (2013.01) |
| *G06T 19/00* | (2011.01) |

(52) U.S. Cl.
CPC ................ *G09G 5/38* (2013.01); *G06F 3/0231* (2013.01); *G06F 3/0482* (2013.01); *G06F 3/0485* (2013.01); *G06F 3/04892* (2013.01); *G06F 17/30274* (2013.01); *G06F 3/0484* (2013.01); *G06T 19/00* (2013.01); *H04N 21/23412* (2013.01); *H04N 21/47205* (2013.01)

(58) Field of Classification Search
None
See application file for complete search history.

(56) References Cited

U.S. PATENT DOCUMENTS

| | | | |
|---|---|---|---|
| 6,449,608 B1 | 9/2002 | Morita et al. | ...................... 707/3 |
| 2005/0210411 A1 * | 9/2005 | Morita | ........................... 715/825 |

(Continued)

FOREIGN PATENT DOCUMENTS

| | | | |
|---|---|---|---|
| JP | 7-225765 | A | 8/1995 |
| JP | 11-232006 | A | 8/1999 |
| JP | 2004-260412 | A | 9/2004 |
| JP | 2004-297176 | A | 10/2004 |

(Continued)

*Primary Examiner* — Jwalant Amin
(74) *Attorney, Agent, or Firm* — Fitzpatrick, Cella, Harper & Scinto

(57) ABSTRACT

A display control apparatus displays image data pieces based on an array in which the image data pieces are sorted in accordance with a specified rule. The display control apparatus extracts, with use of one image data piece from the array as a reference, image data pieces at a set interval from the image data pieces arranged in the array, and arranges and displays the extracted image data pieces that include the reference image data piece on a screen of a display unit based on an order of the array. If the reference image data piece or the interval used in the extraction of the image data pieces has been changed based on an instruction from a user, the display on the display unit is changed with use of the new reference and interval.

7 Claims, 27 Drawing Sheets

(56) References Cited

U.S. PATENT DOCUMENTS

| | | | |
|---|---|---|---|
| 2006/0227223 A1* | 10/2006 | Nagata | 348/231.5 |
| 2006/0228096 A1 | 10/2006 | Hoshino et al. | 386/46 |
| 2008/0063357 A1 | 3/2008 | Kunieda et al. | 386/52 |
| 2008/0147664 A1 | 6/2008 | Fujiwara et al. | 707/7 |
| 2008/0276280 A1 | 11/2008 | Nashida et al. | 725/48 |
| 2008/0292212 A1 | 11/2008 | Ozaki | 382/284 |
| 2009/0070710 A1 | 3/2009 | Kagaya et al. | 715/810 |

FOREIGN PATENT DOCUMENTS

| | | |
|---|---|---|
| JP | 2006-065368 A | 3/2006 |
| JP | 2006-101270 A | 4/2006 |
| JP | 2006-153965 A | 6/2006 |
| JP | 2006-279267 A | 10/2006 |
| JP | 2006-285471 A | 10/2006 |
| JP | 2007-133761 A | 5/2007 |
| WO | WO 00/33570 A1 | 6/2000 |

* cited by examiner

FIG. 4

| DATA ID | METADATA | DATA | THUMBNAIL |
|---:|---:|---:|---:|
| 1 | 2005/2/5 | 1.jpg | thumb1.jpg |
| 2 | 2005/3/7 | 2.jpg | thumb2.jpg |
| 3 | 2005/7/10 | 3.jpg | thumb3.jpg |
| ... | ... | ... | ... |
| 92 | 2006/1/25 | 92.jpg | thumb92.jpg |
| 93 | 2006/2/14 | 93.jpg | thumb93.jpg |
| 94 | 2006/3/11 | 94.jpg | thumb94.jpg |
| 95 | 2006/3/25 | 95.jpg | thumb95.jpg |
| 96 | 2006/4/14 | 96.jpg | thumb96.jpg |
| 97 | 2006/5/11 | 97.jpg | thumb97.jpg |
| 98 | 2006/6/26 | 98.jpg | thumb98.jpg |
| 99 | 2006/7/10 | 99.jpg | thumb99.jpg |
| 100 | 2006/8/20 | 100.jpg | thumb100.jpg |
| 101 | 2006/9/22 | 101.jpg | thumb101.jpg |
| 102 | 2006/10/12 | 102.jpg | thumb102.jpg |
| 103 | 2006/10/25 | 103.jpg | thumb103.jpg |
| 104 | 2006/11/13 | 104.jpg | thumb104.jpg |
| 105 | 2006/11/25 | 105.jpg | thumb105.jpg |
| 106 | 2006/12/13 | 106.jpg | thumb106.jpg |
| 107 | 2006/12/25 | 107.jpg | thumb107.jpg |
| 108 | 2006/12/26 | 108.jpg | thumb108.jpg |
| ... | ... | ... | ... |
| 1000 | 2008/3/5 | 1000.jpg | thumb1000.jpg |

FIG. 5A

| REFERENCE DATA | EXTRACTED DATA | DISPLAY STATE |
|---|---|---|
| 100 | ... | NONDISPLAY |
| | 76 | NONDISPLAY |
| | 79 | NONDISPLAY |
| | 82 | NONDISPLAY |
| | 85 | DISPLAY |
| | 88 | DISPLAY |
| | 91 | DISPLAY |
| | 94 | DISPLAY |
| | 97 | DISPLAY |
| | 100 | DISPLAY |
| | 103 | DISPLAY |
| | 106 | DISPLAY |
| | 109 | DISPLAY |
| | 112 | DISPLAY |
| | 115 | NONDISPLAY |
| | 118 | NONDISPLAY |
| | 121 | NONDISPLAY |
| | 124 | NONDISPLAY |
| | ... | |

INTERVAL 3

FIG. 5B

| REFERENCE DATA | EXTRACTED DATA | DISPLAY STATE |
|---|---|---|
| 100 | ... | NONDISPLAY |
| | 84 | NONDISPLAY |
| | 86 | NONDISPLAY |
| | 88 | NONDISPLAY |
| | 90 | NONDISPLAY |
| | 92 | DISPLAY |
| | 94 | DISPLAY |
| | 96 | DISPLAY |
| | 98 | DISPLAY |
| | 100 | DISPLAY |
| | 102 | DISPLAY |
| | 104 | DISPLAY |
| | 106 | DISPLAY |
| | 108 | DISPLAY |
| | 110 | NONDISPLAY |
| | 112 | NONDISPLAY |
| | 114 | NONDISPLAY |
| | 116 | NONDISPLAY |
| | ... | |

INTERVAL 2

FIG. 5C

| REFERENCE DATA | EXTRACTED DATA | DISPLAY STATE |
|---|---|---|
| 100 | ... | NONDISPLAY |
| | 92 | NONDISPLAY |
| | 93 | NONDISPLAY |
| | 94 | NONDISPLAY |
| | 95 | NONDISPLAY |
| | 96 | DISPLAY |
| | 97 | DISPLAY |
| | 98 | DISPLAY |
| | 99 | DISPLAY |
| | 100 | DISPLAY |
| | 101 | DISPLAY |
| | 102 | DISPLAY |
| | 103 | DISPLAY |
| | 104 | DISPLAY |
| | 105 | NONDISPLAY |
| | 106 | NONDISPLAY |
| | 107 | NONDISPLAY |
| | 108 | NONDISPLAY |
| | ... | |

INTERVAL 1

POSITIONAL RELATIONSHIP WITH RESPECT TO REFERENCE DATA
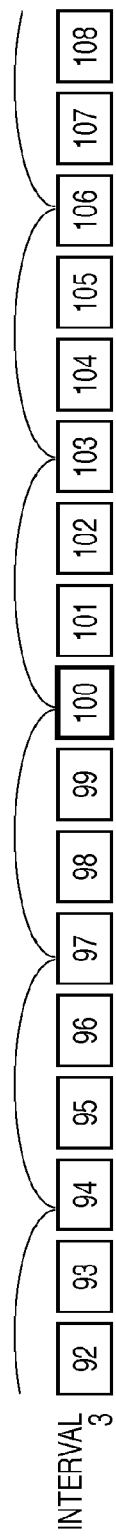
F I G. 6A
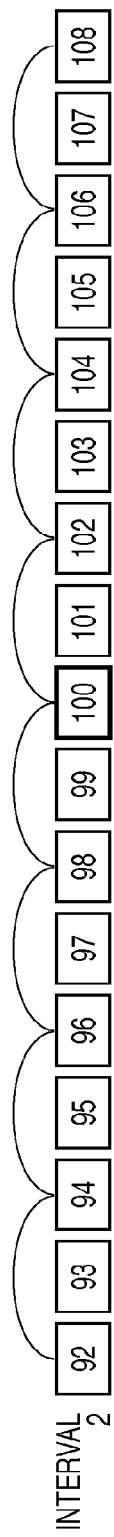
F I G. 6B
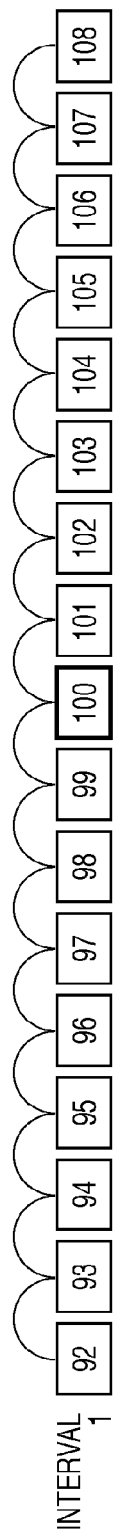
F I G. 6C

INTERVAL 3 | 88 | 91 | 94 | 97 | 100 | 103 | 106 | 109 | 112

801

↑ WIDE INTERVAL

710

INTERVAL 2 | 92 | 94 | 96 | 98 | 100 | 102 | 104 | 106 | 108

802

710

INTERVAL 1 | 96 | 97 | 98 | 99 | 100 | 101 | 102 | 103 | 104

803

↓ NARROW INTERVAL

710

F I G. 9
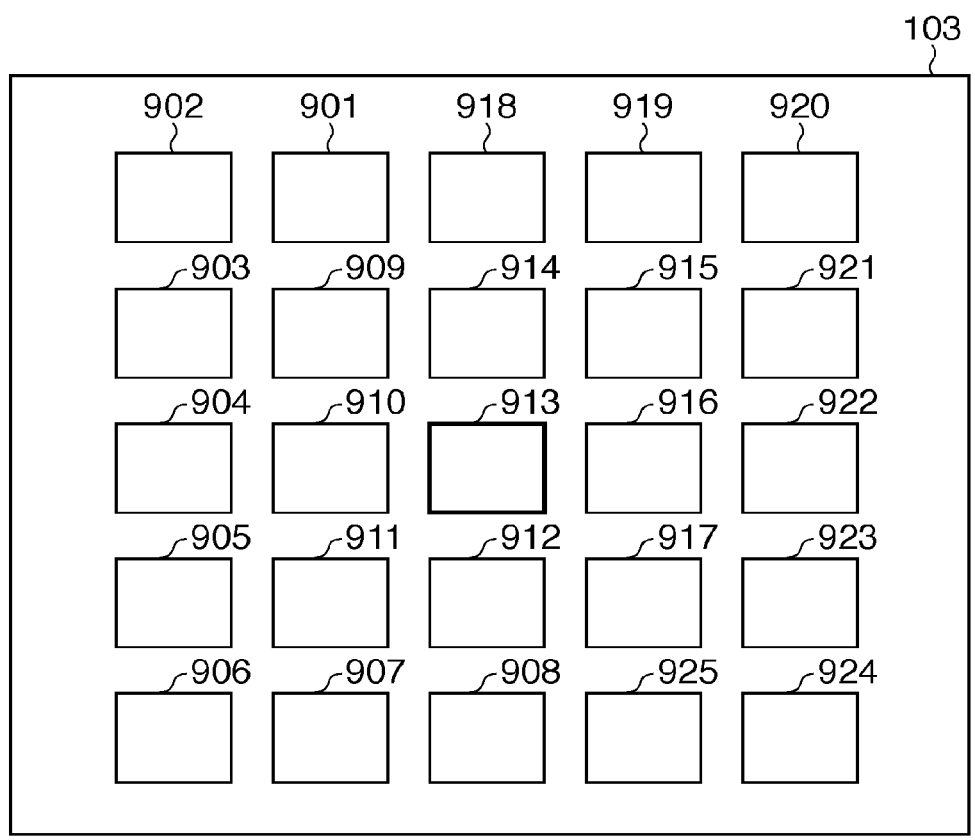

FIG. 10A

| 121 | 124 | 127 | 130 | 133 |
|---|---|---|---|---|
| 118 | 106 | 109 | 112 | 136 |
| 115 | 103 | 100 | 97 | 85 |
| 64 | 88 | 91 | 94 | 82 |
| 67 | 70 | 73 | 76 | 79 |

1001

INTERVAL 3

FIG. 10B

| 114 | 116 | 118 | 120 | 122 |
|---|---|---|---|---|
| 112 | 104 | 106 | 108 | 124 |
| 110 | 102 | 100 | 98 | 90 |
| 76 | 92 | 94 | 96 | 88 |
| 78 | 80 | 82 | 84 | 86 |

1002

INTERVAL 2

FIG. 10C

| 107 | 108 | 109 | 110 | 111 |
|---|---|---|---|---|
| 106 | 102 | 103 | 104 | 112 |
| 105 | 101 | 100 | 99 | 95 |
| 88 | 96 | 97 | 98 | 94 |
| 89 | 90 | 91 | 92 | 93 |

1003

INTERVAL 1

WIDE INTERVAL ↔ NARROW INTERVAL

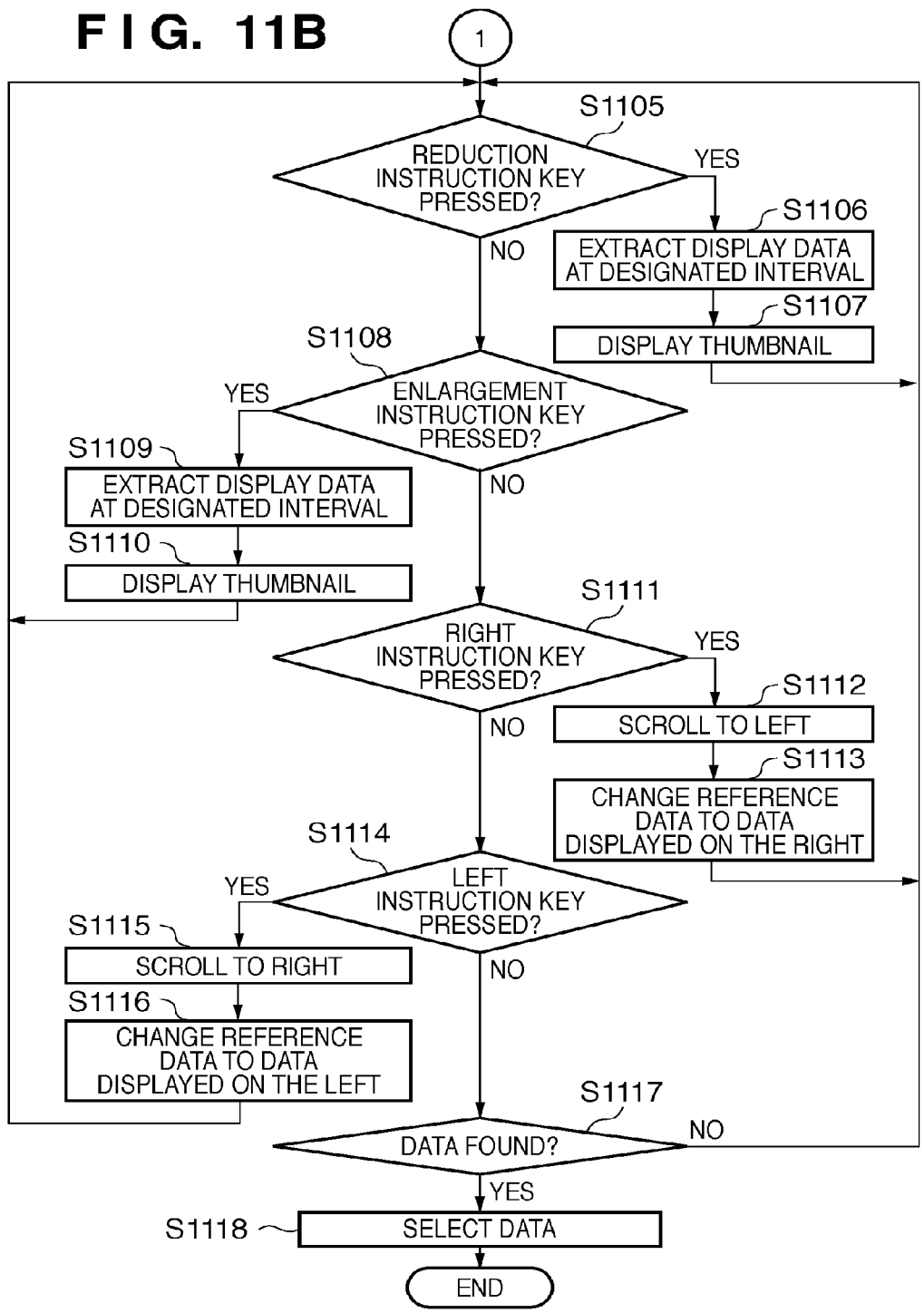

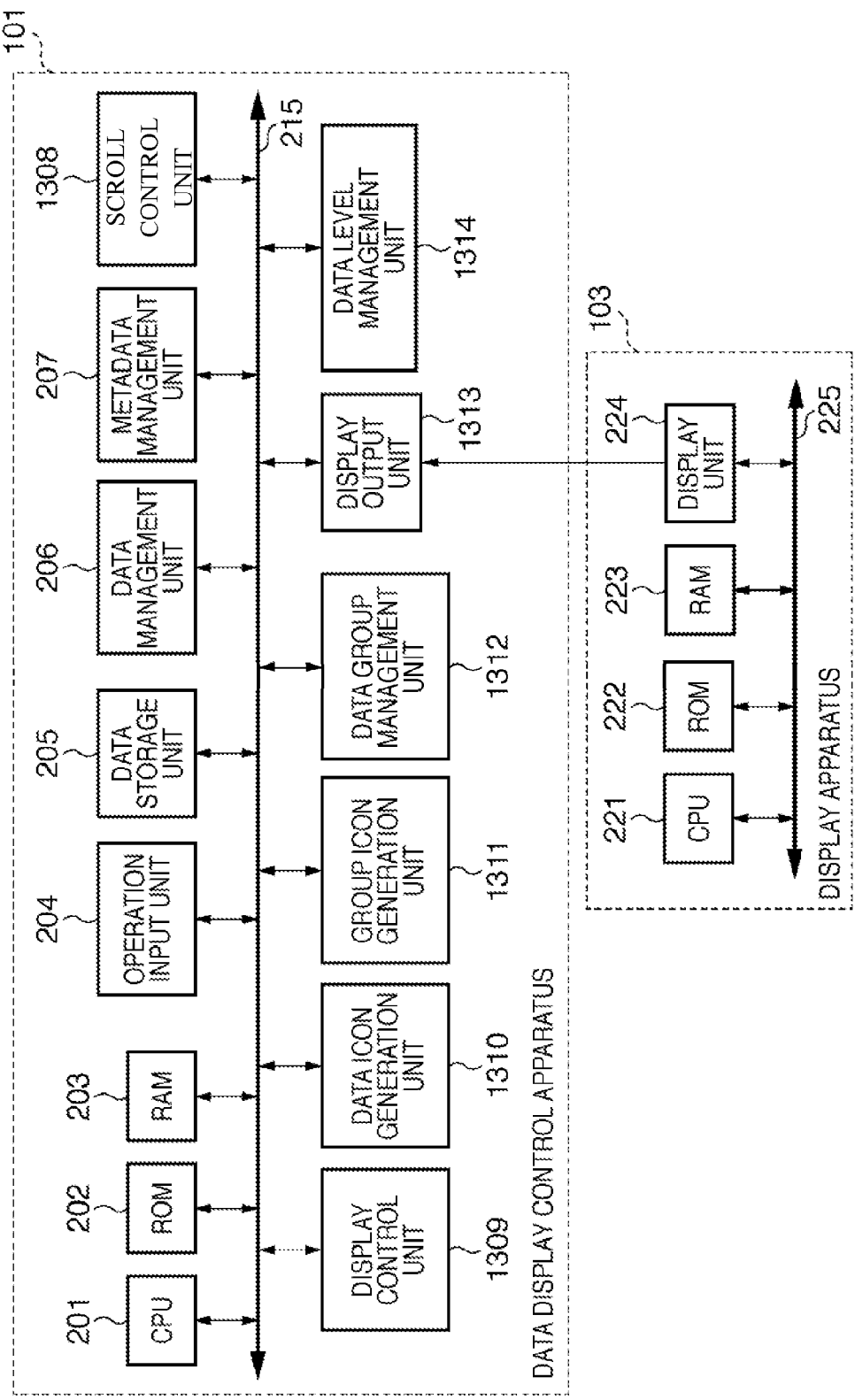

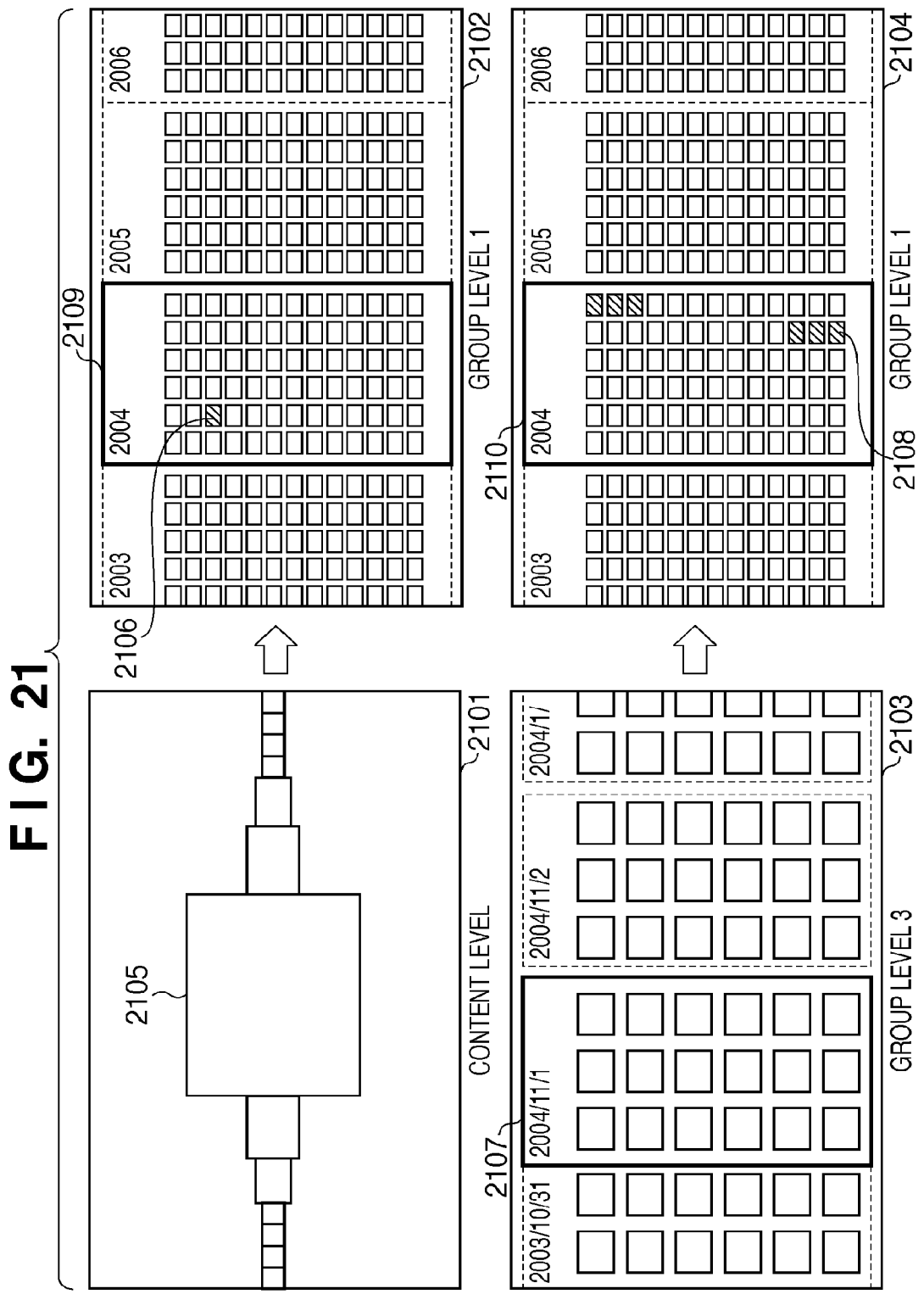

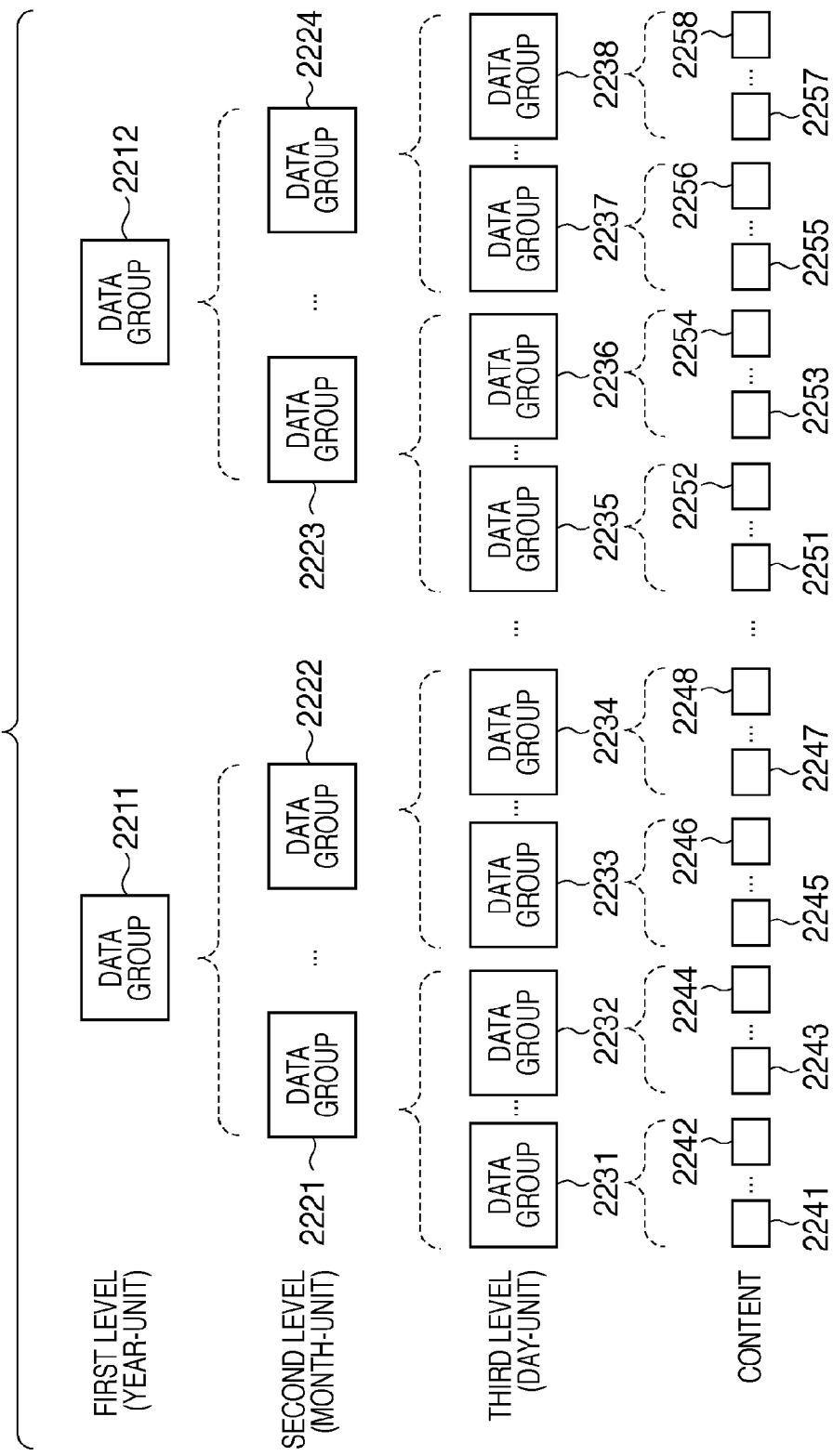

F I G. 23A
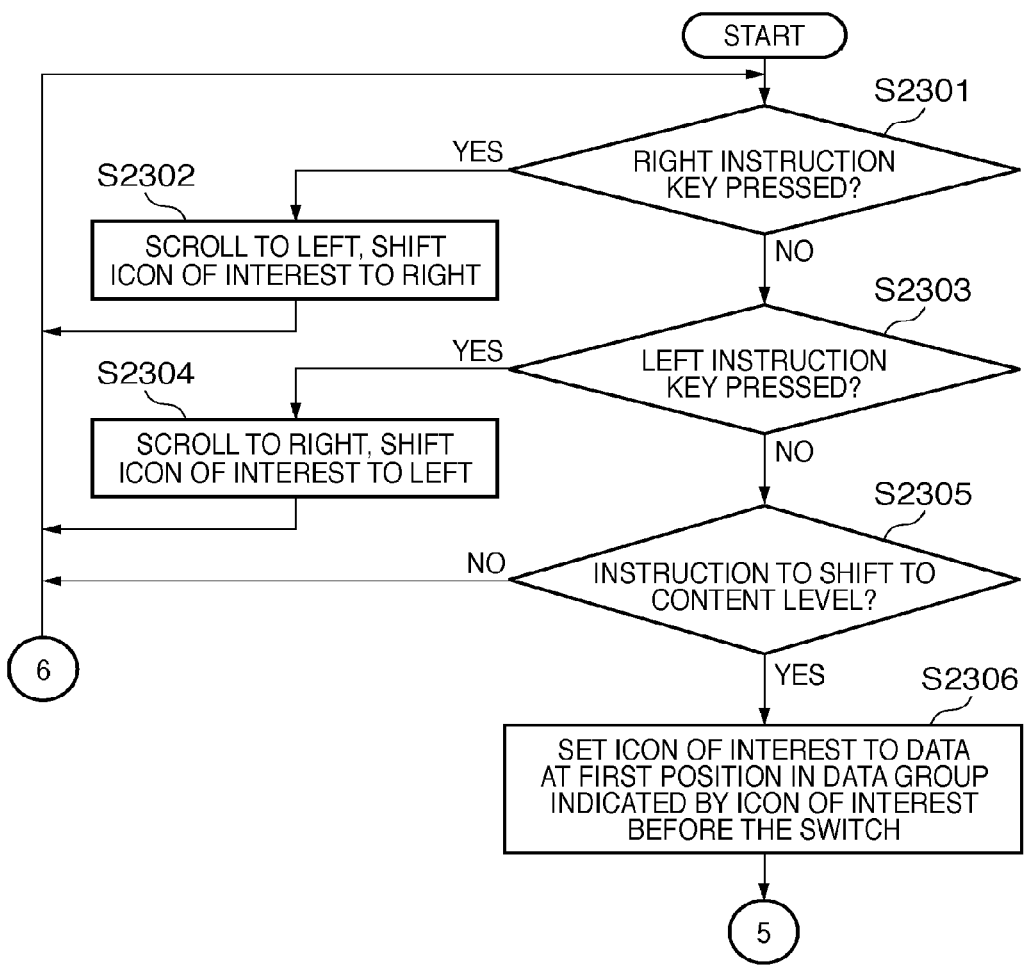

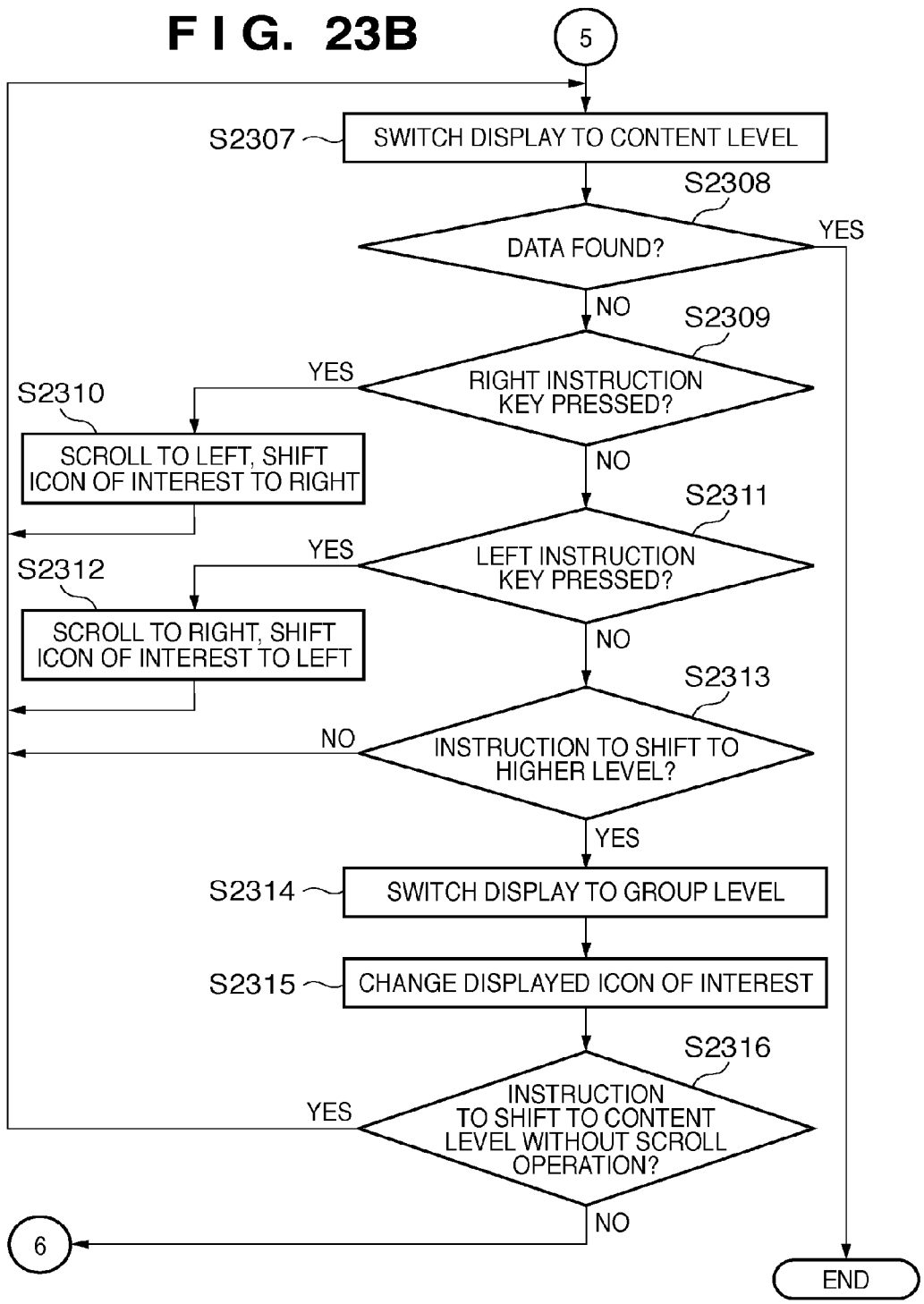

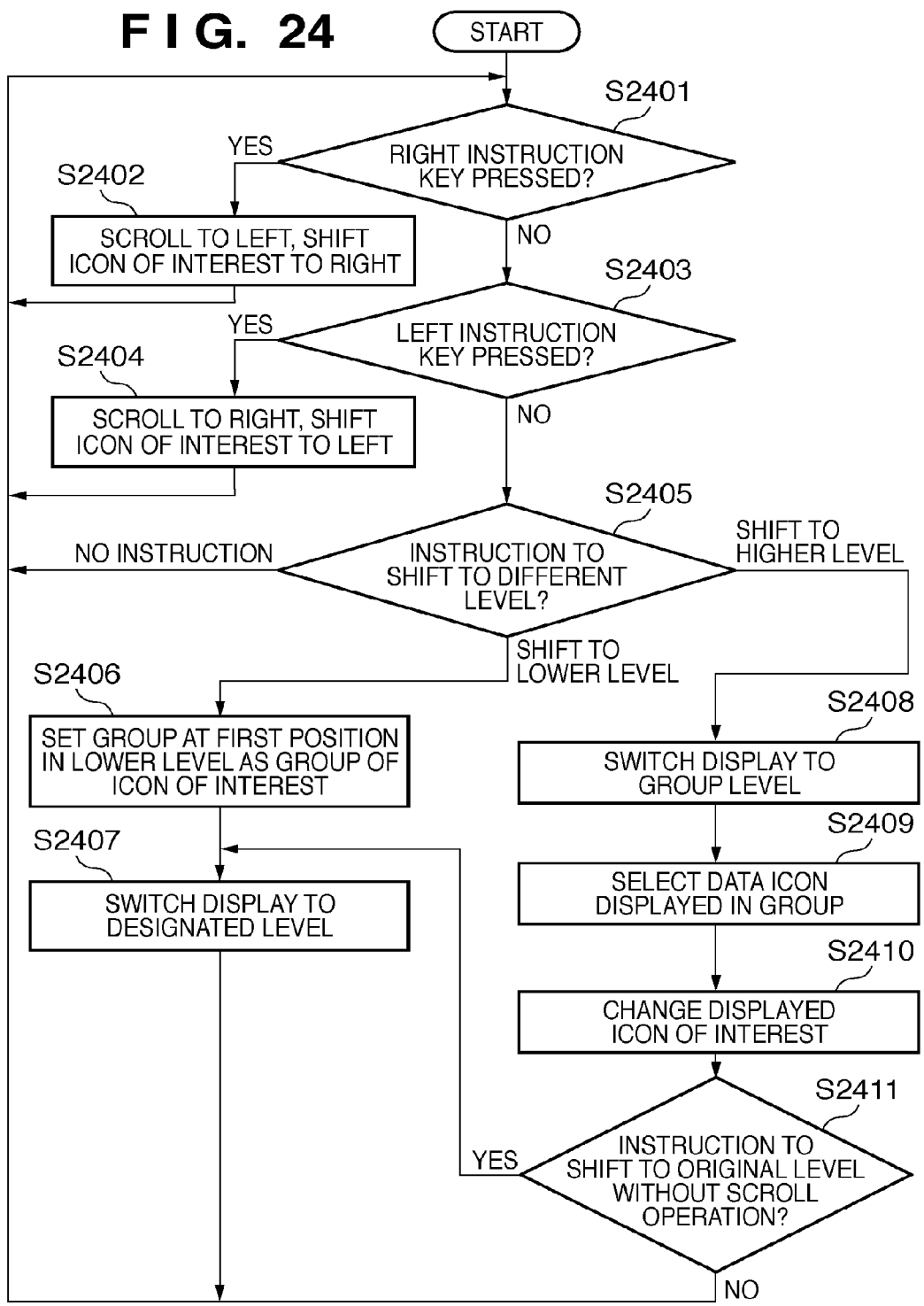

DISPLAY CONTROL APPARATUS AND DISPLAY CONTROL METHOD

CROSS REFERENCE TO RELATED APPLICATION

This application is a continuation of U.S. application Ser. No. 12/482,137 filed on Jun. 10, 2009, the entire disclosure of which is hereby incorporated by reference herein. This application also claims foreign priority under 35 U.S.C. §119 of Japanese Application No. 2008-249129 filed on Sep. 26, 2008, and Japanese Application No. 2008-172645 filed on Jul. 1, 2008.

BACKGROUND OF THE INVENTION

1. Field of the Invention

The present invention relates to a display control apparatus that displays an array of still image data, moving image data, additional information, thumbnails, and the like, and a method for the same.

2. Description of the Related Art

In recent years, a storage function has been provided in not only PCs and dedicated storage apparatuses but also in cameras and the like for capturing image data, and in devices that store broadcast content and the like, such as a disk recorder. There are also display apparatuses for displaying a list of data (content) that is stored in such devices. An example of this type of display apparatus is an apparatus that displays a list of all data by text such as data names. Also, in recent years, there have been list displays that include the explicit display of images or videos that show an overview of data, such as thumbnails of data or a reproduced portion of a characteristic part of data. In such a list display, data can be displayed in various orders, such as date or filename order. This display method shows data in a way that enables an overview of the data to be easily understood, and is also effective when a user is searching for a desired piece of data.

In this way, there have been proposals of various user interfaces for displaying an array of still image data, moving image data, additional information, thumbnails, and the like, and for enabling searching for a desired piece of data by switching the display of data in accordance with a user operation. There have also been proposals to facilitate finding data by organizing and grouping data, as well as proposals to display a group of data by a single icon or the like in such cases. In this case, the icon for the data group has often been generated from an image composed of a representative piece of data in the data group, or from an image composed of part or all of the data in the data group. An icon can be generated with use of all of the data in a group by, for example, reducing the thumbnails of data in the group and generating an icon that displays all the reduced thumbnails, or generating an icon in which thumbnails are overlaid.

In order to facilitate finding data in a displayed list of data, there have also been proposals to add various types of metadata to the data, determine an order based on the metadata, and sort the data based on the determined order. For example, data has been sorted in date order, or in order of the Japanese syllabary, alphabetical order, and the like with respect to metadata. Furthermore, there have been innovations for further facilitating finding data by hierarchically managing such metadata. For example, dates are divided into year, month, and day levels and grouped, and by switching the display to higher or lower levels, the user can select a desired location from his or her memory and find data.

There has also been a proposal for creating a group of data, displaying a representative thumbnail for the group, and furthermore dynamically changing the level of detail of the group in accordance with a user operation, thereby enabling finding desired data (Japanese Patent Laid-Open No. 2006-65368).

There has also been a proposal to group the structure of a Web page in a hierarchical structure, and enable browsing data while changing the level of detail in the display by changing the display hierarchy in accordance with a user operation (Japanese Patent Laid-Open No. 2007-133761).

Also, when users attempt to find desired content while browsing various content, there is demand for the ability to move among pieces of the content and arrive at the desired content as fast as possible. In such visual searching of content in which desired content is searched for while browsing various pieces of content by scrolling, the ability to scroll at high speed is very important.

There has also been an increase in the need to be able to browse content by displaying the content on a TV or the like, and there is demand for the ability to perform operations with a remote controller that only has arrow keys or a limited number of keys, instead of an operation unit that enables freely performing operations, such as a keyboard or a mouse. Accordingly, when browsing by scrolling through pieces of content, it is becoming very important to be able to easily perform operations with a small number of keys.

Japanese Patent Laid-Open No. 2004-297176 discloses managing data in a hierarchical structure of year/month/day, displaying a representative image for each level, and sequentially switching to a lower level each time a representative image is selected. In Japanese Patent Laid-Open No. 2004-297176, an arbitrary image is selected from among images in a group and displayed as the representative image, and the displayed image is sequentially switched as time elapses. Also, the size of the group is shown by displaying the number of images in the group.

Japanese Patent Laid-Open No. H07-225765 discloses that for document data managed in a hierarchical structure, the inclusion relation between levels is displayed, and structure units are expressed according to the size of lower-level groups. Also, Japanese Patent Laid-Open No. 2006-285471 discloses showing, with use of an indicator, which part of the whole is being displayed at a display target position.

SUMMARY OF THE INVENTION

However, the above-described grouping of data (content) has problems such as the following. Specifically, (1) When selecting a certain piece of data, it is impossible to give an instruction for data to be displayed at a level of detail necessary for the purpose of selecting the certain piece of data.

(2) It is impossible to set a certain piece of data as a reference and display other data having a desired degree of association.

(3) When changing the level of detail, if the size of displayed data is changed (reduced) in order to display more data, the display becomes not-easily-viewable, thereby making searching for data difficult.

(4) The level of detail changes with use of the first data as a reference, which is not suited for searching for data in the vicinity of a desired location.

(5) When organizing data by, for example, hierarchical grouping and creating folders, and browsing data by sequentially opening folders, finding desired data requires the trouble of shifting up and down between levels etc. over and over.

Also, technology for scrolling in the content display described above has problems such as the following.

(1) When in a certain level and scrolling over a border to a higher-level group, in the case of switching to the higher level in order to know one's position, display can be performed for a wider range. However, the group icon did not show which portion (range) of the group was being checked. For this reason, although the group icon of the higher level can show the position of the desired content, it is impossible to know the distance from the desired content. In other words, when switching from a position (range) being checked in a lower level to a higher level, it was impossible to know what position was being shown. Also, when switching to a higher level, it is impossible to recognize the distance from the position (range) being checked in the lower level to the position of the desired content displayed in the higher level.

(2) The number of pieces of content included in a group of course increases when shifting to a higher level. For this reason, when shifting to a higher level, it becomes more difficult to know the position that is being checked and the position of the desired content.

(3) When successively switching up and down between levels in accordance with the order of levels, a long time was required for switching in a case of checking a position in a higher level.

(4) When skipping a level in switching, it was impossible to know what level was being switched from, and it was difficult to return to the original position in the original level.

(5) Displaying the indicator took up display area, thereby reducing the number of content images that could be displayed. Also, when visually searching by scrolling, focus is put on the content portion being scrolled, and there are fewer opportunities to see the indicator, thereby causing cases in which searching was confusing.

According to one embodiment of the present invention, there is provided a display apparatus and a control method for the same that enable easily selecting desired data from a list display of data.

Also, according to another embodiment of the present invention, there is provided a display apparatus and a control method for the same that, when switching the level that is displayed, enable knowing in the list display of the post-switch level the position of the data group or data that was selected in the level displayed before the switch, thereby improving operability.

According to one aspect of the present invention, there is provided a display control apparatus that displays a plurality of image data pieces based on an array in which the plurality of image data pieces are sorted in accordance with a specified rule, comprising: an extraction unit that, with use of one image data piece from the array as a reference, extracts a plurality of image data pieces at a set interval from the image data pieces arranged in the array; a display control unit that arranges and displays, on a screen of a display unit based on an order of the array, the plurality of image data pieces extracted by the extraction unit and that include the reference image data piece; and a change unit that changes a display of the display unit by changing the reference image data piece or the interval used by the extraction unit based on an instruction from a user, and causes the extraction unit and the display control unit to function with use of the changed reference image data piece or the changed interval.

Also, according to another aspect of the present invention, there is provided a display control apparatus that groups a plurality of data pieces into a plurality of data groups based on additional information of the data pieces, forms a hierarchical structure by grouping the plurality of data groups based on the additional information of the data pieces constituting the groups, and displays an icon for each data piece or for each group in accordance with the hierarchical structure, comprising: a display unit that arranges an array of icons for data pieces or groups belonging to a designated level from the hierarchical structure in accordance with the additional information, and displays the array of icons; a change unit that sets one icon from among the icons displayed by the display unit as an icon of interest, and, in accordance with operation input, changes the icon of interest according to an order of the array; a switch unit that switches a level displayed by the display unit in accordance with operation input; and a generation unit that, if the switch unit has switched to a higher level, generates an icon so that a location of an icon of interest in the array in a level before the switch is explicit in an icon indicating, among groups in a level after the switch, a group to which a data piece or a group corresponding to the icon of interest belongs.

Further features of the present invention will become apparent from the following description of exemplary embodiments with reference to the attached drawings.

BRIEF DESCRIPTION OF THE DRAWINGS

FIG. 4 is a diagram showing an exemplary data configuration of a data management table according to Embodiment 1.

FIGS. 5A to 5C are diagrams showing exemplary data configurations of display data management tables having different interval values according to Embodiment 1.

FIGS. 6A to 6C are diagrams showing exemplary data arrays according to Embodiment 1.

FIG. 9 is a diagram showing an exemplary display of a two-dimensional display screen according to Embodiment 1.

FIGS. 10A to 10C are diagrams showing exemplary transitions in a two-dimensional display screen according to Embodiment 1.

FIGS. 11A and 11B are a flowchart showing a one-dimensional display state transition operation according to Embodiment 1.

FIG. 13 is a diagram showing an exemplary hardware configuration of a content browsing apparatus and a display apparatus according to Embodiment 2.

FIG. 21 is a diagram showing an example of display switching according to Embodiment 2.

FIG. 22 is a diagram that illustrates a concept of data levels according to Embodiment 2.

FIGS. 23A and 23B are a flowchart showing a level shifting operation for shifting between a content level and a group level according to Embodiment 2.

FIG. 24 is a flowchart showing a level shifting operation for shifting between different group levels according to Embodiment 2.

DESCRIPTION OF THE EMBODIMENTS

Below is a description of examples of preferred embodiments of the present invention with reference to the attached drawings.

In the present embodiment, a display control apparatus stores a plurality of moving image data pieces and still image data pieces, and arrives at a target data piece while changing a level of detail of a thumbnail list display of the stored data. Accordingly, the term "data" used in the following embodiments is synonymous with "content". First is a description of an overall system configuration of the display control apparatus according to the present embodiment.

System Configuration

Figure 1:
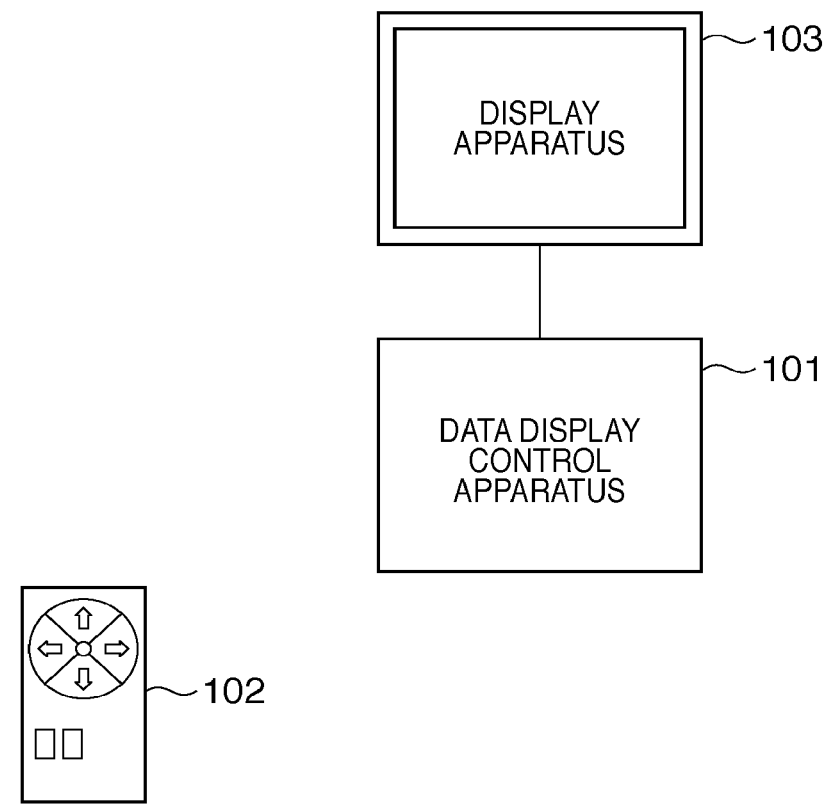
FIG. 1 is a diagram showing an exemplary configuration of a data display system according to Embodiment 1.

FIG. 1 shows an exemplary configuration of a data display system envisioned in the present embodiment. In FIG. 1, reference numeral 101 denotes a data display control apparatus, which stores data (content), forms an array of thumbnails of the data, arranges the thumbnails, and displays the arranged thumbnails on a display apparatus 103. Reference numeral 102 denotes a remote controller that has an operation input function for, for example, data selection and display switching.

Figure 2:
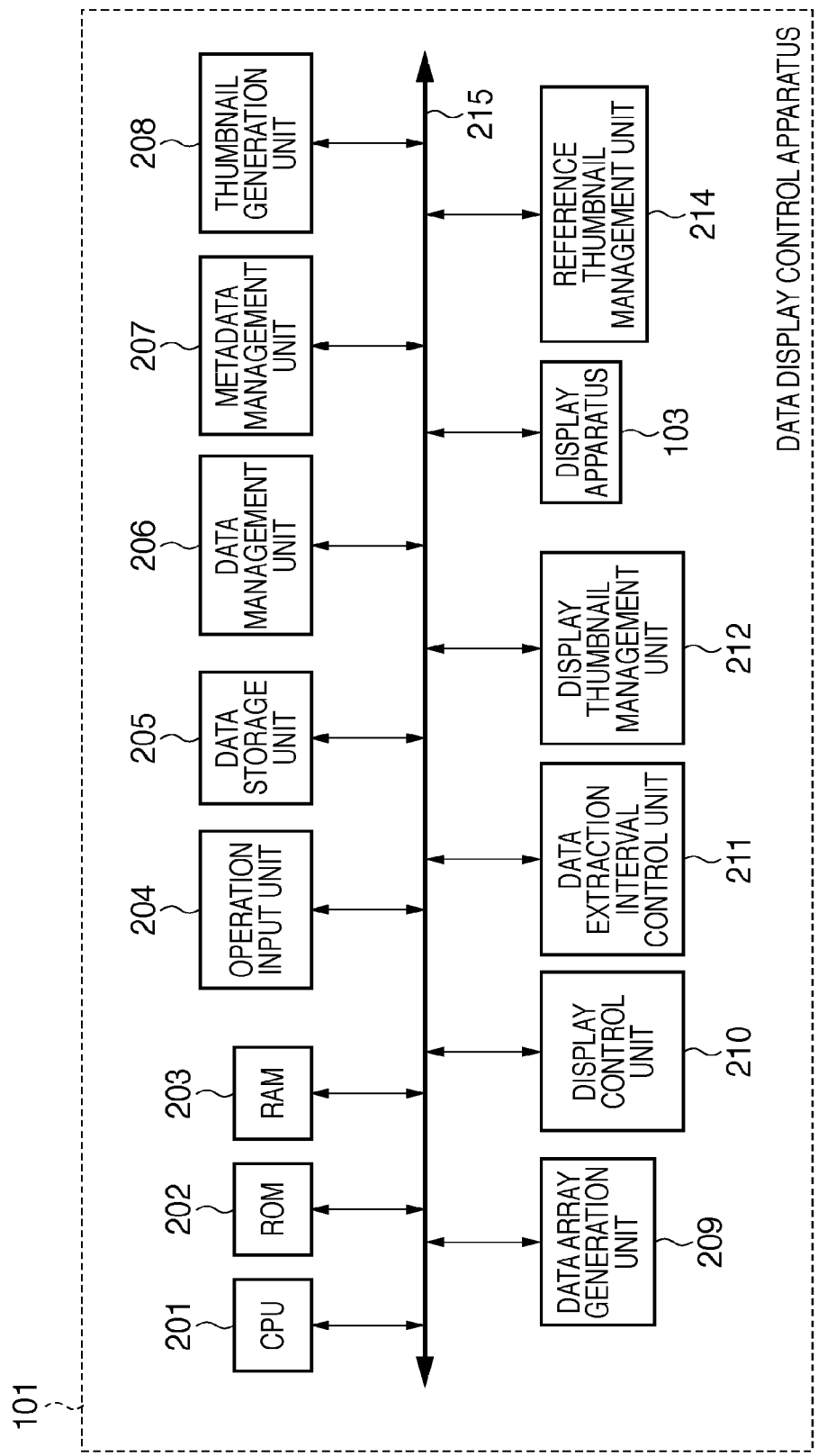
FIG. 2 is a diagram showing an exemplary hardware configuration of a data display control apparatus according to Embodiment 1.

FIG. 2 shows an exemplary configuration of the data display control apparatus 101. In FIG. 2, reference numeral 201 denotes a central control unit (CPU), 202 denotes a read-only memory (ROM), and reference numeral 203 denotes a random access memory (RAM), all of which are included in the data display control apparatus 101. Reference numeral 204 denotes an operation input unit that receives an operation command from the remote controller 102. Reference numeral 205 denotes a data storage unit that holds data to be displayed, and in the present embodiment, the data storage unit 205 stores still image data and moving image data. Reference numeral 206 denotes a data management unit that manages the data held by the data storage unit 205. Reference numeral 207 denotes a metadata management unit that manages metadata added to the data stored in the data storage unit 205.

Reference numeral 208 denotes a thumbnail generation unit, which generates thumbnails for displaying a list of the data held in the data storage unit 205. Reference numeral 209 denotes a data array generation unit, which generates an array in which a plurality of image data pieces is sorted according to a specified rule (array condition). Specifically, the data array generation unit 209 generates a data management table such as shown in FIG. 4, in accordance with the array condition and the metadata managed by the metadata management unit 207. The data array generation unit 209 also has a function for generating a data array in accordance with an array condition that has been designated by a user via the operation input unit 204. Reference numeral 210 denotes a display control unit, which displays the thumbnails generated by the thumbnail generation unit 208, in accordance with display data management tables shown in FIGS. 5A to 5C, which were generated by a display thumbnail management unit 212 that is described later.

Reference numeral 211 denotes a data extraction interval control unit that changes an extraction interval for data to be displayed, in accordance with an instruction from the operation input unit 204. Reference numeral 212 denotes a display thumbnail management unit, which, if an instruction to change the extraction interval has been received, determines a thumbnail to be displayed, and updates the display data management tables described later with use of FIGS. 5A to 5C. Reference numeral 103 denotes a display apparatus. Reference numeral 214 denotes a reference thumbnail management unit, which manages and updates data to be a reference (hereinafter, called "reference data"). Reference data refers to data to be a reference in the list display described below, and in the list display of the present embodiment, focus is put on this reference data. Reference numeral 215 denotes an internal bus that connects the constituent elements described above.

It should be noted that part or all of the functions of the constituent elements 204 to 214 described above may be realized by the CPU 201 executing a program stored in the ROM 202 or the RAM 203.

Figure 3:
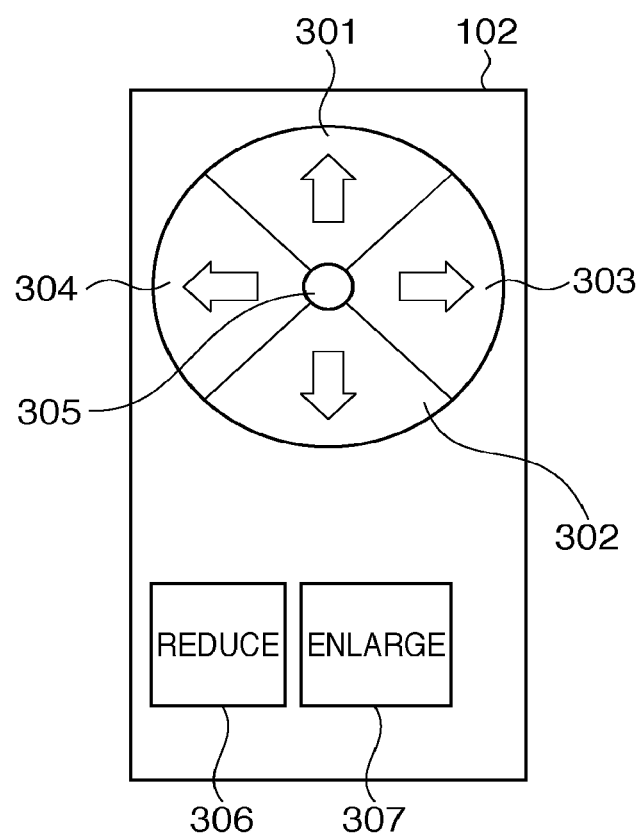
FIG. 3 is a diagram showing an external view of a remote controller according to Embodiment 1.

FIG. 3 is a diagram showing an external view of the remote controller 102. In FIG. 3, reference numeral 301 denotes an up instruction key that gives the instruction for "up", reference numeral 302 denotes a down instruction key that gives the instruction for "down", reference numeral 303 denotes a right instruction key that gives the instruction for "right", and reference numeral 304 denotes a left instruction key that gives the instruction for "left", and these keys are used to perform an operation for, for example, shifting reference data (a thumbnail corresponding to the reference data). In the present embodiment, the screen is scrolled in accordance with operations of these keys, and the data to be a reference is changed by this scrolling (described in detail later). Reference numeral 305 denotes an OK key, which is a key used to determine a selection or an operation. Reference numeral 306 denotes a reduction instruction key that gives the instruction for the reduction of the extraction interval of displayed data in order to raise the level of detail of displayed thumbnails. Also, reference numeral 307 denotes an enlargement instruction key that gives the instruction for the enlargement of the extraction interval of displayed data in order to lower the level of detail of displayed thumbnails.

FIG. 4 is a diagram showing an exemplary data configuration of a data management table generated by the data array generation unit 209. As shown in FIG. 4, data IDs for uniquely recognizing each data piece, added metadata, still image/moving image data, and thumbnails of each data piece are managed in the data management table. In the example shown in FIG. 4, the data pieces are sorted in date order by using date metadata added to each image data piece as the array condition.

FIGS. 5A to 5C are diagrams showing exemplary data configurations of display data management tables generated by the display thumbnail management unit 212. FIG. 5A shows a display data management table 501 in the case where the extraction interval of thumbnails to be displayed is "3". FIG. 5B shows a display data management table 502 in the case where the extraction interval of thumbnails to be displayed is "2". Furthermore, FIG. 5C shows a display data management table 503 in the case where the extraction interval of thumbnails to be displayed is "1". Each table includes reference data, a column of data extracted by the display thumbnail management unit 212, and a state parameter that indicates the state of display by the display control unit 210. These display data management tables are updated if the interval changes or if the reference data changes.

FIGS. 6A to 6C are diagrams showing data arrays. FIGS. 6A to 6C show positional relationships of arranged data pieces with respect to reference data, as well as thumbnails that are displayed when an instruction for various extraction intervals has been given. Here, the reference data is a data piece whose ID is 100, and hereinafter, data whose ID is xxx is referred to as data [xxx] (e.g., data whose ID is 100 is referred to as data [100]). FIG. 6A shows thumbnails that are to be displayed if an extraction interval of "3" has been instructed, and data [94], [97], [100], [103], [106], and the like are extracted, and among these, the number that is displayed is equal to the number of display positions set for the display screen. FIG. 6B shows thumbnails that are to be displayed if the instruction for an extraction interval of "2" has been given. In the case of FIG. 6B, data [92], [94], [96], [98], [100], [102], [104], [106], [108] and the like are extracted, and among these, the number that is displayed is equal to the number of display positions set for the display screen. FIG. 6C shows thumbnails that are to be displayed if the instruction for an extraction interval of "1" has been given, and all data centered around data [100] is extracted, and among these, the number that is displayed is equal to the number of display positions set for the display screen.

Figure 7:
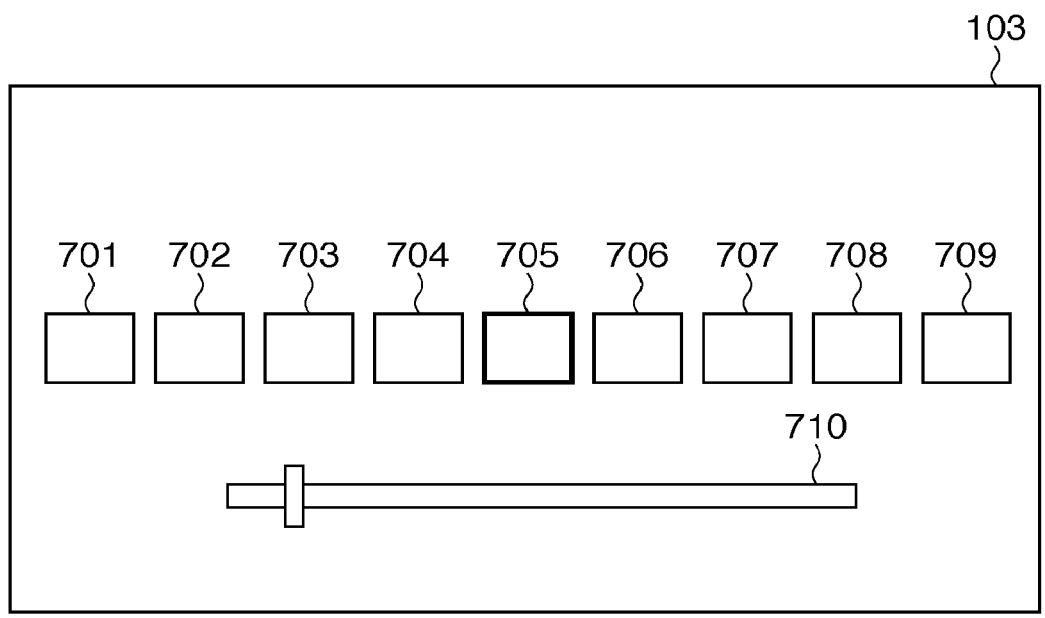
FIG. 7 is a diagram showing an exemplary display of a one-dimensional display screen according to Embodiment 1.

FIG. 7 shows an exemplary screen display, which is a one-dimensional display of thumbnails according to the present embodiment. As shown in FIG. 7, in the one-dimensional display screen, the display positions of thumbnails on the display apparatus 103 are arranged in a one-dimensional array by the display control unit 210. Here, the thumbnail of the reference data is displayed at a display position 705 that is in the center of display positions 701 to 709, and the thumbnails of the other data are displayed at the remaining display positions 701 to 704 and 706 to 709. Image data is sequentially arranged at the display positions 701 to 704 and 706 to 709 in order of proximity to image data that is the reference in the array, beginning from the display positions that are adjacent to the display position 705 of the image data that is the reference. The reference data can be changed to any data indicated by the displayed thumbnails, with use of the right instruction key 303 and the left instruction key 304 of the remote controller 102. In the present embodiment, the screen is scrolled with use of the right instruction key 303 or left instruction key 304, and an image (thumbnail) newly displayed at the center display position 705 becomes the new reference data. Reference numeral 710 is an indicator that displays the level of detail of the thumbnails displayed according to the extraction interval.

Figure 8A:
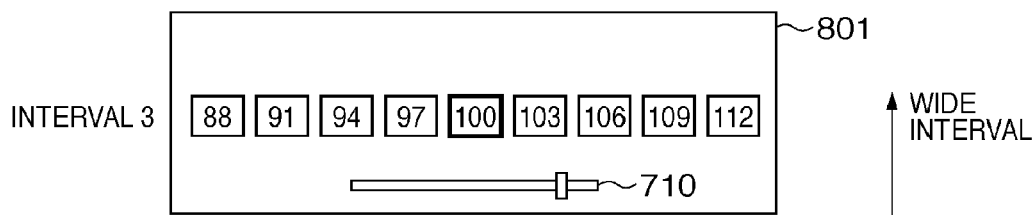
FIGS. 8A to 8C are diagrams showing exemplary transitions in a one-dimensional display screen according to Embodiment 1.
Figure 8B:
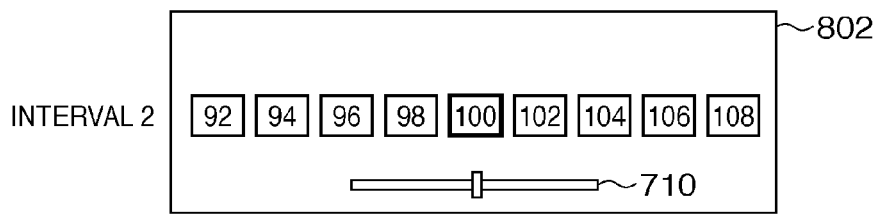
Figure 8C:
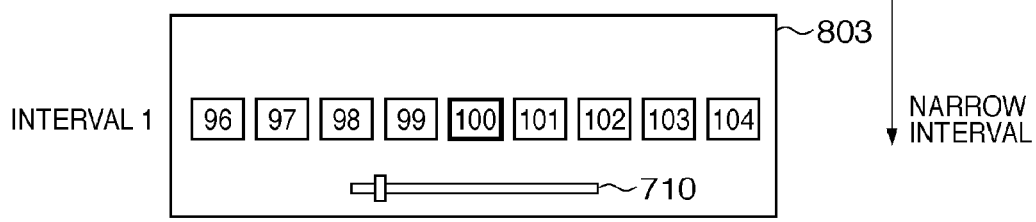

FIGS. 8A to 8C are diagrams showing transitions in displays when the level of detail (thumbnail extraction interval) in the one-dimensional display screen shown in FIG. 7 has been changed by an operation of the reduction instruction key 306 or enlargement instruction key 307 of the remote controller 102.

FIG. 8A shows a display screen 801 when an extraction interval of "3" has been instructed, FIG. 8B shows a display screen 802 when an extraction interval of "2" has been instructed, and FIG. 8C shows a display screen 803 when an extraction interval of "1" has been instructed. In the display state of the display screen 801, the display data management table is the display data management table 501 shown in FIG. 5A, and the display control unit 210 displays thumbnails based on this table. Accordingly, data [88], [91], [94], [97], [100], [103], [106], [109], and [112] are arranged at the display positions 701 to 709 respectively.

Here, when the reduction instruction key 306 of the remote controller 102 has been pressed, the data extraction interval control unit 211 changes the extraction interval to "2", and the display thumbnail management unit 212 changes the table data management table to the table shown in FIG. 5B. Then, the display control unit 210 references the changed display data management table, displays thumbnails using the data [100] as a reference, and changes the display to the display screen 802. If the reduction instruction key 306 has been pressed again, the data extraction interval control unit 211 changes the extraction interval to "1", and the display thumbnail management unit 212 changes the display data management table to the table shown in FIG. 5C. Then, the display control unit 210 references the changed display data management table, displays thumbnails using the data [100] as a reference, and changes the display to the display screen 803.

In other words, in accordance with the extraction interval reduction instruction, the thumbnails of the data [97] and the data [103] displayed at the display positions 704 and 706 in the display screen 801 are changed to thumbnails of the data [98] and [102] respectively. In accordance with yet another extraction interval reduction instruction, the thumbnails at the display positions 704 and 706 are changed to thumbnails of the data [99] and the data [101]. The thumbnails at the display positions 701, 702, 703, 707, 708, and 709 are also changed to the thumbnails having the respective data IDs shown in the display screen 802. Also, the indicator 710 changes from the state shown in the display screen 801 to the state shown in the display screen 802 in accordance with the reduction in the extraction interval. Note that in the examples shown in FIGS. 8A to 8C, the indicator 710 shows that the farther to the left side the slider is, the narrower the interval is.

The following describes the case in which the instruction for enlargement has been given in the display state of the display screen 803, in which the data [96], [97], [98], [99], [100], [101], [102], [103], and [104] are arranged at the display positions 701 to 709 respectively. When the enlargement instruction key 307 of the remote controller 102 has been pressed in the state of the display screen 803, the data extraction interval control unit 211 changes the extraction interval to "2", and the display thumbnail management unit 212 changes the display data management table to the table shown in FIG. 5B. Then, the display control unit 210 references the changed display data management table, displays thumbnails using the data [100] as a reference, and changes the display to the display screen 802. When the enlargement instruction key 307 has been pressed again in the state of the display screen 802, the data extraction interval control unit 211 changes the extraction interval to "3", and the display thumbnail management unit 212 changes the display data management table to the table shown in FIG. 5A. Then, the display control unit 210 references the changed display data management table, displays thumbnails using the data [100] as a reference, and changes the display to the display screen 802.

In other words, in accordance with the pressing of the enlargement instruction key 307, the thumbnails of the data [99] and the data [101] displayed at the display positions 704 and 706 in the display screen 803 are changed to thumbnails of the data [98] and the data [102] respectively. In accordance with a further extraction interval enlargement instruction, the thumbnails displayed at the display positions 704 and 706 in the display screen 802 are changed to thumbnails of the data [97] and the data [103] respectively. The thumbnails at the display positions 701, 702, 703, 707, 708, and 709 are also changed to the thumbnails having the respective data IDs shown in the display screens 802 and 801.

FIG. 9 is a diagram showing an exemplary screen showing a two-dimensional display of thumbnails according to the present embodiment. As shown in FIG. 9, in the two-dimensional display screen, the thumbnails are arranged in a two-dimensional array on the display apparatus 103 by the display control unit 210. The display control unit 210 displays the thumbnail of the reference data at a display position 913, and arranges and displays data at adjacent display positions 909 to 912 and 914 to 917 in order of proximity to the reference data. Furthermore, the display control unit 210 arranges and displays data at display positions 901 to 908 and 918 to 925 in order of the next closest data to the reference data. By operating the up, down, right, and left instruction keys 301, 302, 303, and 304 of the remote controller 102, the user can change the reference data to any data indicated by the displayed thumbnails. In other words, as a result of scrolling up, down, to the left, or to the right, data corresponding to a thumbnail newly displayed at the display position 913 is set as the new reference data.

FIGS. 10A to 10C are diagrams showing transitions in the two-dimensional display screen when the level of detail (thumbnail extraction interval) has been changed by an operation of the reduction instruction key 306 or enlargement instruction key 307 of the remote controller 102.

FIG. 10A shows a display screen 1001 when an extraction interval of "3" has been instructed, FIG. 10B shows a display screen 1002 when an extraction interval of "2" has been instructed, and FIG. 10C shows a display screen 1003 when an extraction interval of "1" has been instructed. These display screens are displayed as a result of the display control unit 210 referencing the display data management tables 501, 502, and 503, and arranging the data extracted according to the intervals at the display positions in accordance with the respective arrays. For example, in the display state of the display screen 1001, the data [88], [91], [94], and [97] are arranged at the display positions 909 to 912 respectively, and the data [103], [106], [109], and [112] are arranged at the display positions 914 to 917 respectively.

Here, similarly to as described above in the example of the one-dimensional display, when the reduction instruction key 306 of the remote controller 102 has been pressed, the display data management table 501 is updated to the display data management table 502. The display control unit 210 arranges and displays the thumbnails with reference to the updated display data management table 502. As a result, the display is updated to the display screen 1002. When the reduction instruction key 306 has been pressed again, the display data management table 502 is updated to the display data management table 503, and the display control unit 210 arranges the thumbnails with reference to the updated display data management table 503. As a result, the display is updated to the display screen 1003.

In other words, the thumbnails at the display positions 909 to 912 in the display screen 1001 are changed to the thumbnails of the data [92], [94], [96], and [98] in the array generated by the data array generation unit. The thumbnails at the display positions 914 to 917 are also changed to the thumbnails of the data [102], [104], [106], and [108]. When the reduction instruction key 306 has been pressed in this state, the thumbnails at the display positions 909 to 912 are changed to the thumbnails of the data [96], [97], [98], and [99] as shown in the display screen 1003. The thumbnails at the display positions 914 to 917 are also changed to the thumbnails of the data [101], [102], [103], and [104].

The thumbnails at the display positions 901 to 908 and 918 to 925 are also changed to the thumbnails having the respective data IDs shown in the display screen 1002 or the display screen 1003.

Also, when the enlargement instruction key 307 of the remote controller 102 has been pressed in the display state shown in the display screen 1003, the display state changes opposite to the way described above. Specifically, the display control unit 210 arranges and displays the thumbnails with reference to the updated display data management table 502. As a result, the display is updated to the display screen 1002. When the enlargement instruction key 307 has been pressed again, the display data management table 502 is updated to the display data management table 501, and the display control unit 210 arranges the thumbnails with reference to the updated display data management table 501. As a result, the screen is updated to the display screen 1001.

In other words, in the display screen 1002, the thumbnails at the display positions 909 to 912 are changed to the thumbnails of the data [92], [94], [96], and [98]. The thumbnails at the display positions 914 to 917 are also changed to the thumbnails of the data [102], [104], [106], and [108]. Furthermore, when the enlargement instruction key 307 of the remote controller 102 has been pressed in the state shown in the display screen 1002, the display is transitioned to the display screen 1001. In other words, the thumbnails at the display positions 909 to 912 are changed to the thumbnails of the data [88], [91], [94], and [97]. The thumbnails at the display positions 914 to 917 are then changed to the thumbnails of the data [103], [106], [109], and [112].

It should be noted that the thumbnails at the display positions 901 to 908 and 918 to 925 are also changed to the thumbnails having the respective data IDs shown in the display screens 1002 and 1003.

Detailed Description of Operations

The following describes specific operations of the present apparatus in several different cases.

Figure 11A:
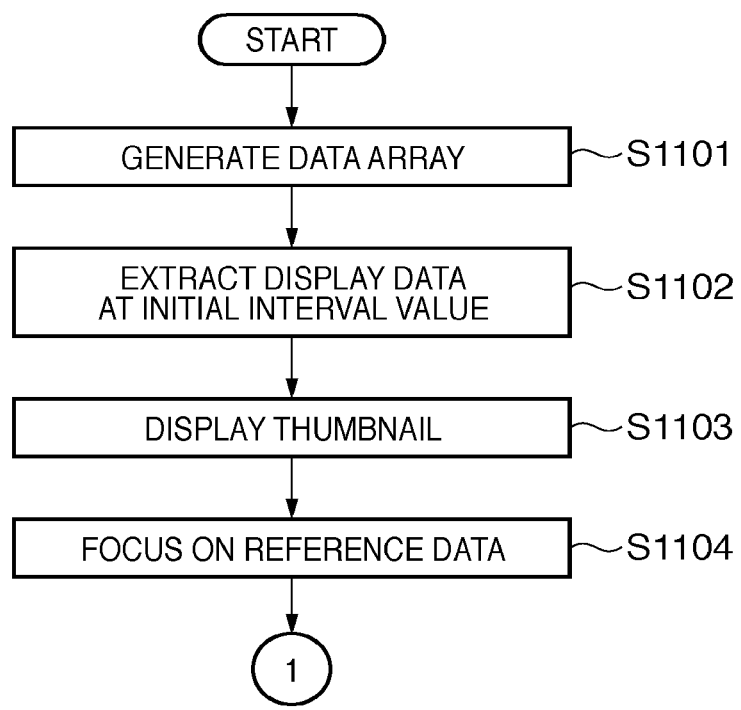

FIGS. 11A and 11B are a flowchart showing a one-dimensional display state transition operation according to the present embodiment.

First, the data array generation unit 209 arranges data stored in the data storage unit 205 in an array in accordance with an order of metadata managed by the metadata management unit 207, and generates the data management table shown in FIG. 4 (step S1101). Here, the array is generated with use of date metadata. Next, the display thumbnail management unit 212 extracts display data in accordance with an arbitrary initial data interval value, and generates the display data management table as shown in FIGS. 5A to 5C (step S1102). The display control unit 210 then displays thumbnails of the extracted data on the display apparatus 103 in accordance with the display data management table (step S1103). The display control unit 210 then sets an arbitrary data piece as reference data and focuses on the display position at which the thumbnail of the reference data is displayed (step S1104). Here, the initial extraction interval value is considered to be "3", the display thumbnail management unit 212 is considered to generate the display data management table 501 (FIG. 5A), and thumbnails are considered to be displayed as shown in the display screen 801 (FIG. 8A). It should be noted that the reference data can be data that is in the center of display data when displaying data beginning with the first data, data that is in the center of all data, data that was last set as reference data in the previous display, or the like.

When the operation input unit 204 has detected input from the reduction instruction key 306 of the remote controller 102 (step S1105), the data extraction interval control unit 211 changes the extraction interval to a lower extraction interval. The display thumbnail management unit 212 then extracts display data at the lowered interval. The display thumbnail management unit 212 then changes the display data management table according to the data extracted at the instructed interval (step S1106). For example, if the interval has been changed from "3" to "2", the display thumbnail management unit 212 changes the display data management table 501 to the display data management table 502. The display control unit 210 then updates the display on the display apparatus 103 by displaying thumbnails in accordance with the changed display data management table (step S1107). For example, the display is updated from the display screen 801 to the display screen 802. When input from the reduction instruction key 306 has been detected again, the display thumbnail management unit 212 extracts display data at the instructed interval, and updates the display data management table (e.g., updates the display data management table 502 to the display data management table 503). In this way, in accordance with an operation of the reduction instruction key 306, the display state and the extracted data in the display data management table are changed in accordance with a lower interval, and the thumbnail display is updated from the display screen 801 to the display screen 802, and from the display screen 802 to the display screen 803.

When the operation input unit 204 has detected input from the enlargement instruction key 307 in the display state shown in the display screen 803 (step S1108), the data extraction interval control unit 211 changes the extraction interval to a higher interval. The display thumbnail management unit 212 then extracts display data at the higher interval. The display thumbnail management unit 212 then changes the display data management table according to the data extracted in accordance with the instructed interval. For example, if the interval has been changed from "1" to "2", the display thumbnail management unit 212 changes the display data management table 503 to the display data management table 502 (step S1109). The display control unit 210 then updates the display on the display apparatus 103 to the display screen 802 by displaying thumbnails in accordance with the changed display data management table (step S1110). In this way, the extracted data and display state are changed in accordance with an enlarged interval. When input from the enlargement instruction key 307 has again been detected in the display state shown in the display screen 802, the display state and the extracted data in the display data management table are changed in accordance with an enlarged interval according to the processing described above, and the thumbnail display is updated to the display screen 801.

When the operation input unit 204 has detected input from the right instruction key 303 of the remote controller 102 (step S1111), the display control unit 210 scrolls the thumbnails displayed on the display apparatus 103 to the left (step S1112). The reference thumbnail management unit 214 then changes the reference data to the data that is displayed to the right of the data that was treated as the reference data before the scrolling. In other words, the data newly displayed at the reference data display position is considered to be the reference data. The display thumbnail management unit 212 updates the display state and the reference data in the display data management table in conformity with the processing described above (step S1113).

When the operation input unit 204 has detected input from the left instruction key 304 of the remote controller 102 (step S1114), the display control unit 210 scrolls the thumbnails displayed on the display apparatus 103 to the right (step S1115). The reference thumbnail management unit 214 then changes the reference data to the data that is displayed to the left of the data that was treated as the reference data before the scrolling. In other words, the data newly displayed at the reference data display position is considered to be the reference data. The display thumbnail management unit 212 updates the display state and the reference data in the display data management table in conformity with the processing described above (step S1116).

Upon desired data being displayed and found by the user, the user presses the OK key 305. When the operation input unit 204 has detected input from the OK key 305 (step S1117), the CPU 201 selects the found data, that is to say selects the reference data (step S1118). The processing from step S1105 is repeated until operation of the OK key 305 has been detected.

Due to the processing described above, the present embodiment enables the user to change, as necessary, the level of detail in the display of a data list. The present embodiment also enables coming close to and finding desired data by shifting the reference data, thereby facilitating arriving at the desired data.

Figure 12A:
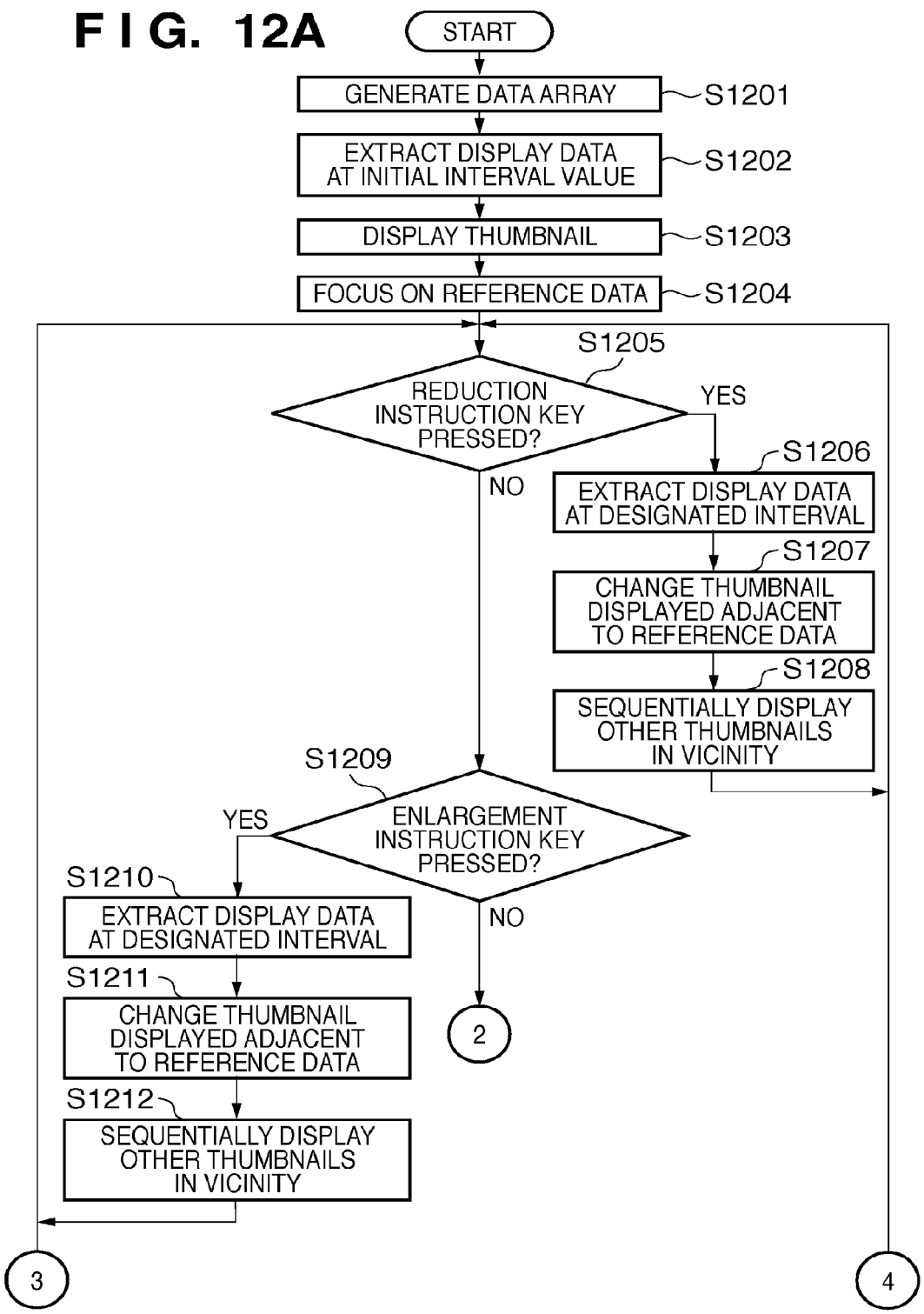
FIGS. 12A and 12B are a flowchart showing a two-dimensional display state transition operation according to Embodiment 1.
Figure 12B:
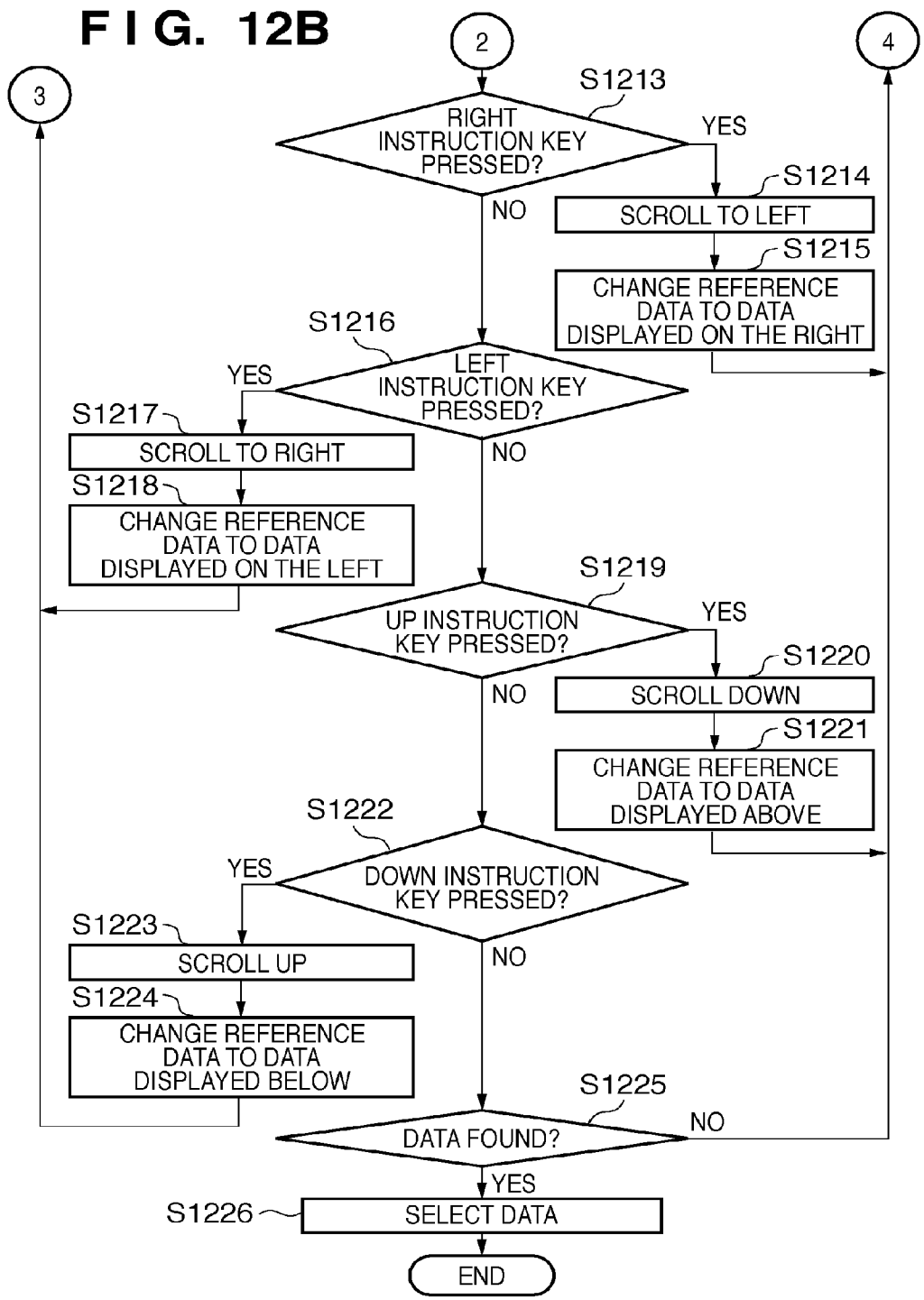

FIGS. 12A and 12B are a flowchart illustrating a two-dimensional display state transition operation according to the present embodiment.

First, the data array generation unit 209 arranges data stored in the data storage unit 205 in an array in accordance with an order of metadata managed by the metadata management unit 207, and generates the data management table shown in FIG. 4 (step S1201). Here, the array is generated with use of date metadata. The display thumbnail management unit 212 extracts display data at an arbitrary data interval (here, the initial data interval value), and generates the display data management table as shown in FIGS. 5A to 5C (step S1202). The display control unit 210 then displays thumbnails of the extracted data on the display apparatus 103 in accordance with the display data management table (step S1203), sets an arbitrary data piece as the reference data, and focuses on that thumbnail display position (step S1204). Here, extraction is considered to be performed at an interval of "3", the data [100] is considered to be the reference data, the data [100] is considered to be arranged at the display position 913, and thumbnails are considered to be displayed as shown in the display screen 1001.

When the operation input unit 204 has detected input from the reduction instruction key 306 of the remote controller 102 (step S1205), the data extraction interval control unit 211 changes the extraction interval to a lower extraction interval. The display thumbnail management unit 212 then extracts display data at the lowered interval, and changes the display data management table according to the data extracted at the designated interval (step S1206). For example, if the interval has been changed from "3" to "2", the display thumbnail management unit 212 changes the display data management table 501 to the display data management table 502. The display control unit 210 then changes the thumbnails arranged at the display positions 909 to 912 and 914 to 917, which are adjacent to the reference data display position 913, in accordance with the changed display data management table (step S1207). Here, the display data management table 501 is updated to the display data management table 502.

For this reason, the thumbnail displayed at the display position 912 is updated from the thumbnail of the data [97] to, among the extracted data, the thumbnail of data that is between the reference data and the data [97] in the array. In other words, the thumbnail of the data [97] is updated to the thumbnail of the data [98]. Also, the thumbnail displayed at the display position 914 is updated from the thumbnail of the data [103] to, among the extracted data, the thumbnail of the data [102] that is between the reference data [100] and the data [103]. Furthermore, the thumbnails arranged at the display positions 909 to 912 and 914 to 917, which are adjacent to the reference data display position 913, are changed to the thumbnails shown in the display screen 1002 shown in FIG. 10B. Moreover, the thumbnails at the display positions 901 to 908 and 918 to 925 are changed in order of proximity to the reference data [100] in accordance with the updated display data management table 502 (step S1208). In this way, the display on the display apparatus 103 is updated to the display screen 1002. When input from the reduction instruction key 306 has been detected again, the display data management table 503 is generated through the processing described above. The display on the display apparatus 103 is updated in accordance with the display data management table 503, and the display screen 1003 is displayed. In this way, the extracted data and display state are changed in accordance with a reduced interval, in accordance with the input from the reduction instruction key 306.

When the operation input unit 204 has detected input from the enlargement instruction key 307 in the display state shown in the display screen 1003 (step S1209), the data extraction interval control unit 211 changes the extraction interval to a higher extraction interval. The display thumbnail management unit 212 then extracts display data at the higher interval. The display thumbnail management unit 212 then changes the display data management table according to the data extracted in accordance with the instructed interval. For example, if the interval has been changed from "3" to "2", the display thumbnail management unit 212 changes the extraction interval to a higher extraction interval by changing the display data management table 503 to the display data management table 502 (step S1210). The display control unit 210 then changes the display on the display apparatus 103 to the display screen 1002 by displaying thumbnails in accordance with the changed display data management table.

Specifically, the display control unit 210 changes the thumbnails arranged at the display positions 909 to 912 and 914 to 917, which are adjacent to the reference data display position 913, in accordance with the display data management table (step S1211). Here, the thumbnail displayed at the display position 912 is updated from the thumbnail of the data [99] to the thumbnail of, among the extracted data, extracted data [98] that is at a position on the opposite side of the reference data (data [100]) in the array. Also, the thumbnail displayed at the display position 914 is updated from the thumbnail of the data to, among the extracted data, the thumbnail of the data [102] that is between the reference data (data [100]) and the data [101]. Furthermore, the thumbnails arranged at the display positions 909 to 912 and 914 to 917, which are adjacent to the reference data display position 913, are changed in accordance with the display data management table 502. Moreover, the thumbnails at the display positions 901 to 908 and 918 to 925 are changed to the thumbnails of extracted data in order of proximity to the reference data (data [100]) (step S1212). In this way, the display on the display apparatus 103 is updated to the display screen 1002. When input from the enlargement instruction key 307 has again been detected, the display state and the extracted data in the display data management table are changed in accordance with an enlarged interval according to the processing described above, and the thumbnail display is updated to the display screen 1001.

When the operation input unit 204 has detected input from the right instruction key 303 of the remote controller 102 (step S1213), the display control unit 210 scrolls the thumbnails displayed on the display apparatus 103 to the left (step S1214). The reference thumbnail management unit 214 then changes the reference data to the data that is displayed to the right of the data that was treated as the reference data before the scrolling. In other words, the data newly displayed at the reference data display position is considered to be the reference data. The display thumbnail management unit 212 updates the display state and the reference data in the display data management table in conformity with the processing described above (step S1215).

When the operation input unit 204 has detected input from the left instruction key 304 of the remote controller 102 (step S1216), the display control unit 210 scrolls the thumbnails displayed on the display apparatus 103 to the right (step S1217). The reference thumbnail management unit 214 then changes the reference data to the data that is displayed to the left of the data that was treated as the reference data before the scrolling. In other words, the data newly displayed at the reference data display position is considered to be the reference data. The display thumbnail management unit 212 updates the display state and the reference data in the display data management table in conformity with the processing described above (step S1218).

When the operation input unit 204 has detected input from the up instruction key 301 of the remote controller 102 (step S1219), the display control unit 210 scrolls the thumbnails displayed on the display apparatus 103 in the down direction (step S1220). The reference thumbnail management unit 214 then changes the reference data to the data that is displayed above the data that was treated as the reference data before the scrolling. In other words, the data newly displayed at the reference data display position is considered to be the reference data. The display thumbnail management unit 212 updates the display state and the reference data in the display data management table in conformity with the processing described above (step S1221).

When the operation input unit 204 has detected input from the down instruction key 302 of the remote controller 102 (step S1222), the display control unit 210 scrolls the thumbnails displayed on the display apparatus 103 in the up direction (step S1223). The reference thumbnail management unit 214 then changes the reference data to the data that is displayed below the data that was treated as the reference data before the scrolling. In other words, the data newly displayed at the reference data display position is considered to be the reference data. The display thumbnail management unit 212 updates the display state and the reference data in the display data management table in conformity with the processing described above (step S1224).

Upon desired data being displayed and found by the user, the user presses the OK key 305. When the operation input unit 204 has detected input of the OK key 305 (step S1225), the CPU 201 selects the found data (i.e., the reference data) (step S1226). The processing from step S1205 is repeated until operation of the OK key 305 has been detected.

According to the embodiment described above, by displaying data having a desired degree of association in the vicinity of a certain data piece, it is possible to easily find and select a desired piece of data. Also, by displaying only data having a predetermined degree of association, the same size of data is displayed even if the level of detail is changed.

Also, since only data having a degree of association that is necessary to a user is displayed, the same size of data is displayed even if the level of detail is changed. Furthermore, when the display is changed by scrolling or the like, the reference image data is shifted to the newly displayed data, thereby enabling easily coming closer to a desired piece of data, and enabling arriving at the desired piece of data without repeatedly shifting up and down between folder levels.

Also, although the order of the array is determined based on date metadata in the embodiment described above, the order may be determined based additionally on time units. Instead of being limited to date metadata, ordering may be performed based on location metadata (i.e., the order of country, then prefecture, and then place name), based on personal name metadata, or the like.

Also, although the thumbnail display is performed one-dimensionally or two-dimensionally in the present embodiment, a three-dimensional display is also possible. Also, a plurality of orders based on metadata may be managed, metadata may be assigned to respective dimensionalities, and arranging in arrays may be performed accordingly.

Although the interval at which data is extracted is changed with use of the remote controller 102 in the present embodiment, the data extraction interval may be changed with use of the indicator 710 on the screen. For example, the display apparatus 103 may be a touch panel, and the display may be changed (the interval may be changed) by sliding the indicator 710 with a touch operation. Also, a data extraction interval may be directly input from the remote controller 102.

Although thumbnails are used in a list display in the embodiment described above, the present invention is not limited to this. For example, it is also possible for the image data used in the list display to be the actual still image data or moving image data, an image that characterizes such image data (e.g., reproduced images from a specified period in moving image data), or the like. This application is also possible in Embodiment 2 that is described below.

In this way, Embodiment 1 enables a user to display a list of data at a desired level of detail using desired data as a reference, and enables the user to easily find and select a desired piece of data.

Embodiment 2 describes a content browsing apparatus that arranges a plurality of image content pieces in an array in order of metadata that has been grouped in a hierarchical structure, scrolls the display while switching displays of the levels, and arrives at a desired content piece. First is a description of an overall system configuration. It should be noted that in the following, an icon corresponding to content (data) is called a data icon. Also, a group of content pieces is called a data group, and an icon for a data group is called a group icon.

System Configuration

The configuration of the system envisioned in the present embodiment is similar to the configuration of Embodiment 1 (FIG. 1). In other words, the content browsing apparatus of Embodiment 2 is realized by the data display control apparatus 101. Note that although the display apparatus 103 is incorporated in the data display control apparatus 101 in Embodiment 1, Embodiment 2 describes the case in which the display apparatus 103 and the data display control apparatus 101 are separate. It is of course clear that a configuration in which the display apparatus 103 and the data display control apparatus 101 are separate is also applicable in Embodiment 1.

FIG. 13 is a block diagram showing an exemplary hardware configuration of the data display control apparatus 101 and the display apparatus 103.

In FIG. 13, the CPU 201, the ROM 202, the RAM 203, the operation input unit 204, the data storage unit 205, the data management unit 206, and the metadata management unit 207 are as described in Embodiment 1. Reference numeral 1308 denotes a scroll control unit that arranges content pieces in an array in accordance with additional information such as metadata, sequentially displays the content pieces, and sequentially changes an icon of interest according to a scroll operation.

Reference numeral 1309 denotes a display control unit, which generates operation screen data for switching a display of data icons or group icons. Reference numeral 1310 denotes a data icon generation unit, which generates a data icon such as a reduced image from content stored in the data storage unit 205. Reference numeral 1311 denotes a group icon generation unit, which generates a group icon, which is a combination of data icons generated by the data icon generation unit 1310, in accordance with groups managed by a data group management unit 1312. Reference numeral 1312 denotes the data group management unit, which creates and manages data groups by grouping content managed by the data management unit 206 according to added metadata, and by further grouping the groups together in a higher level. Specifically, the data group management unit 1312 groups a plurality of data pieces into a plurality of data groups based on additional information of the data pieces, and groups a plurality of data groups based on the additional information of the data constituting the groups, thereby forming a hierarchical structure. Reference numeral 1313 denotes a display output unit, which outputs, to the display apparatus 103, content, icons therefore, operation screen data generated by the display control unit 1309, and the like. Reference numeral 1314 denotes a data level management unit, which creates a hierarchical structure as shown in FIG. 22 from groups created by the data group management unit 1312, and supplies data for switching the display for each level.

In the display apparatus 103, reference numeral 221 denotes a central control unit (CPU), reference numeral 222 denotes a ROM, and reference numeral 223 denotes a RAM. Reference numeral 224 denotes a display unit, which displays display image data that has been generated by the display control unit 1309 of the data display control apparatus 101 and has been output from the display output unit 1313. Reference numeral 225 denotes an internal bus.

Figure 14:
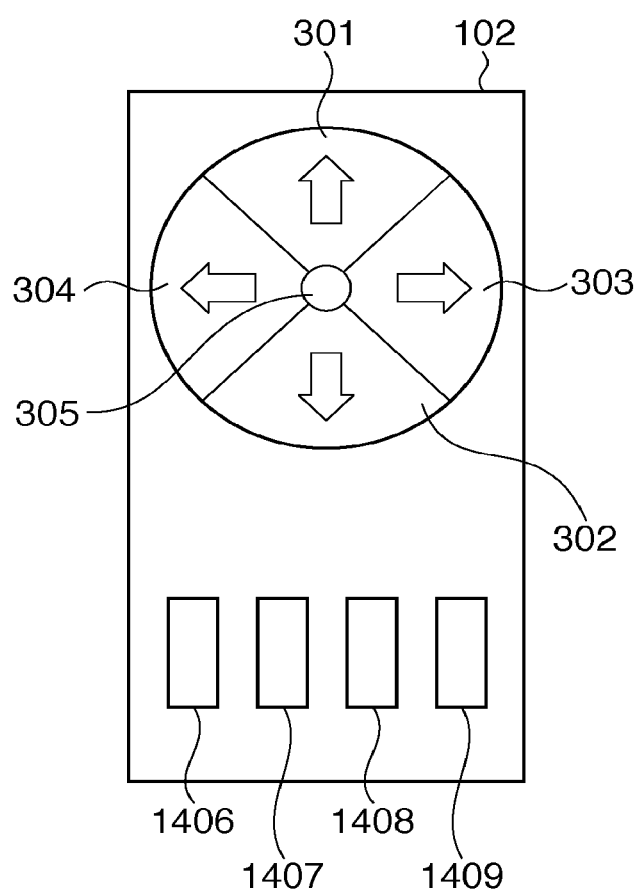
FIG. 14 is a diagram showing an external view of a remote controller according to Embodiment 2.

FIG. 14 shows an external view of the remote controller 102 according to Embodiment 2. In FIG. 14, reference numerals 301 to 305 are the same as in Embodiment 1 (FIG. 3). Reference numerals 1406 to 1409 denote level designation keys for switching the displayed level. A level designation key 1406 instructs a switch to a display of group level 1, a level designation key 1407 instructs a switch to a display of group level 2, a level designation key 1408 instructs a switch to a display of group level 3, and a level designation key 1409 instructs a switch to a display of the content level. The following describes the content level and the group levels.

Figure 15:
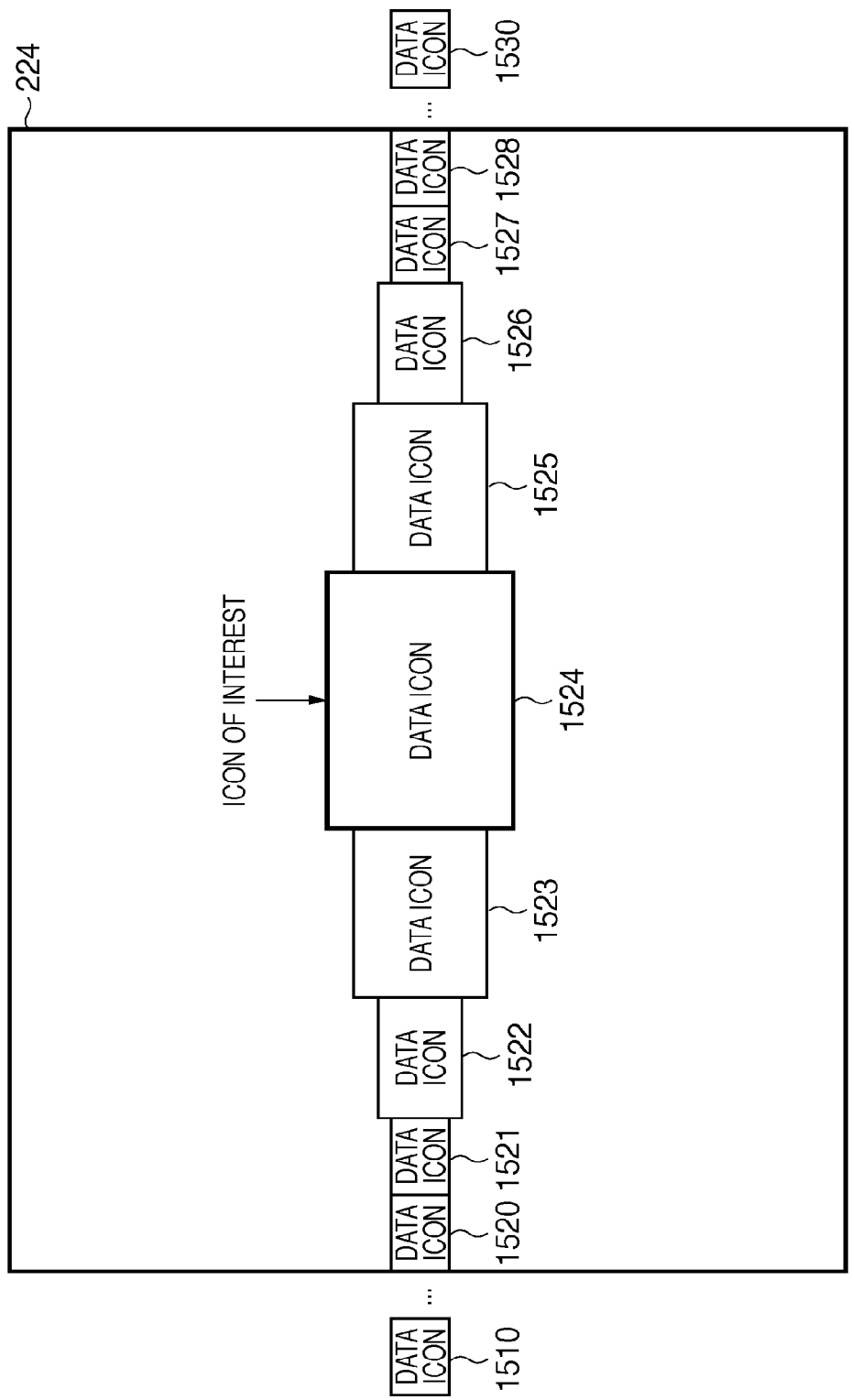
FIG. 15 is a diagram showing an exemplary content level display according to Embodiment 2.

FIG. 15 shows an exemplary content level display. In FIG. 15, data icons 1510 to 1530 that have been generated by the data icon generation unit 1310 are displayed in a line in order of the metadata. In FIG. 15, a plurality of content pieces is displayed on the screen, and the data icon 1524 is the icon of interest. The icon of interest is displayed with a large size in order to indicate that the corresponding data icon is the icon of interest. It should be noted that in the present embodiment, data icons in the vicinity of the icon of interest may also be displayed with a larger size. When a scroll instruction has been received from the left instruction key 303 or right instruction key 304 of the remote controller 102, the data icons are shifted in the opposite direction of the instructed direction in accordance with the sorting order, and the icon of interest is shifted to content in the instructed direction. When the OK key 305 has been pressed, the icon of interest at that time is displayed. It should be noted that the sorting order of the content is determined by arranging additional information of the content in an array under a predetermined order condition. In the present embodiment, the sorting order has been determined by arranging additional information pertaining to time in an array in chronological order.

Figure 16:
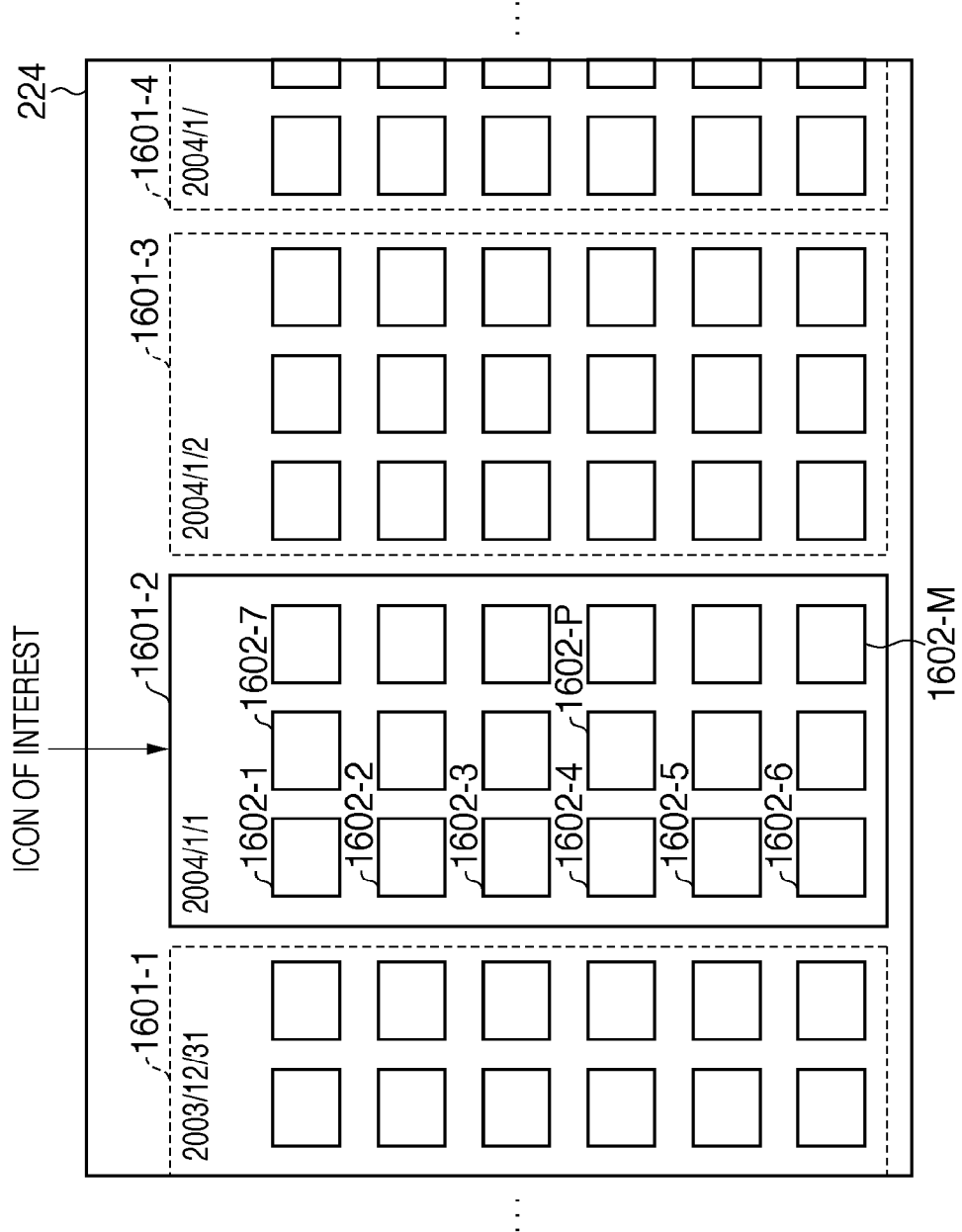
FIG. 16 is a diagram showing an exemplary group level display according to Embodiment 2.

FIG. 16 shows an exemplary group level display for the "date" level. In FIG. 16, group icons 1601-1 to 1601-4 are displayed in a line in order of metadata (year/month/day). Here as well, a plurality of data groups are displayed on the screen, and the group icon 1601-2 is the icon of interest. It should be noted that the icon of interest can be distinguished from other group icons by, for example, changing the thickness of the frame around the icon of interest. When a scroll instruction has been received from the left instruction key 303 or right instruction key 304 of the remote controller 102, the group icons are shifted in the opposite direction of the instructed direction in accordance with the sorting order, and the icon of interest is shifted to a data group in the instructed direction. The group icon 1601 is constituted from a plurality of data icons 1602. In the present example, the group icon generation unit 1311 generates the group icons so that M data icons 1602 are displayed in each group icon 1601. Specifically, each group icon 1601 is formed by displaying M data icons (hereinafter, called selected data icons) selected from among the data pieces that belong to that group.

Figure 17:
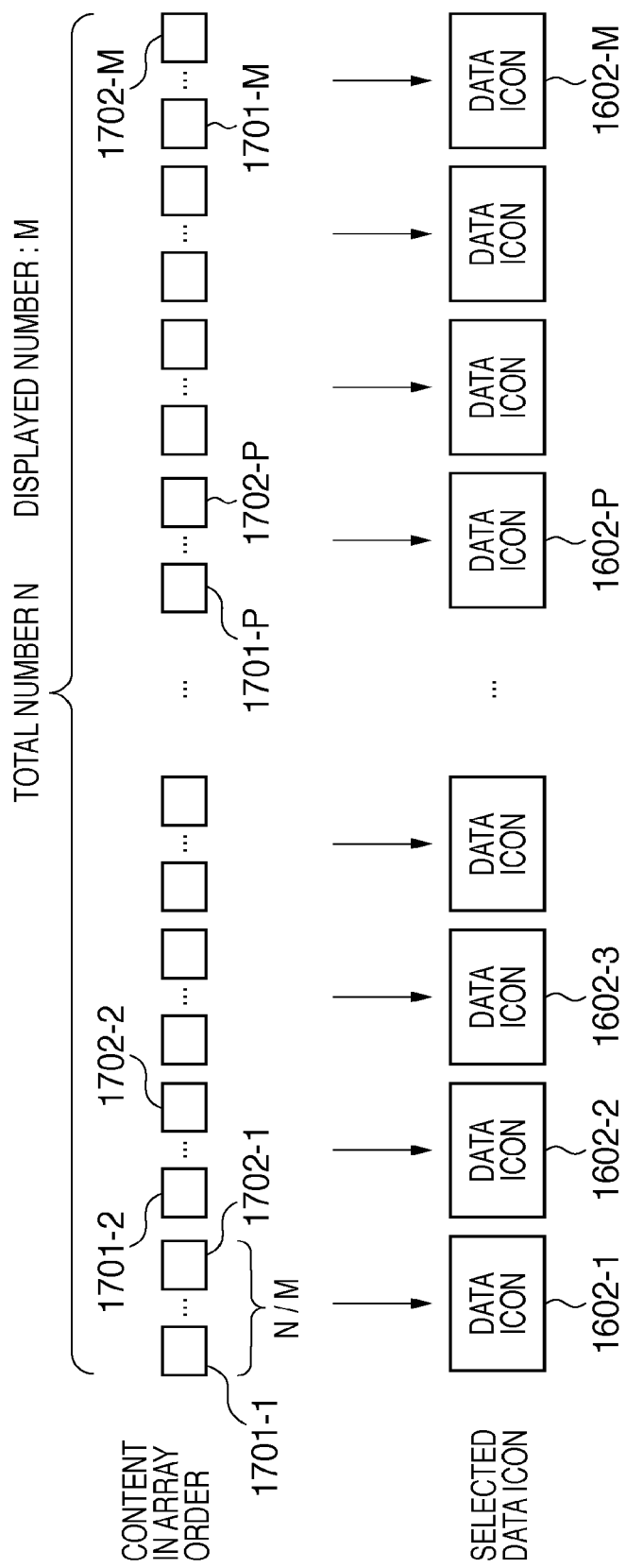
FIG. 17 is a diagram that illustrates a relationship between content in groups and selected data icons according to Embodiment 2.

FIG. 17 is used in the description of the relationship between content in groups and selected data icons. FIG. 17 shows the case in which there are N content pieces in a group, and M data icons are displayed in a group icon. The content pieces are sorted in a metadata order and divided into N/M groups. Then, data icons are extracted by selecting an arbitrary data icon 1602-1 from among content pieces 1701-1 to 1702-1 in a first group, and furthermore selecting an arbitrary data icon 1602-2 from among content pieces 1701-2 to 1702-2 in a second group. In this way, data icons 1602-P are extracted as selected data icons from among arbitrary content pieces 1701-P to 1702-P. Then, the group icon generation unit 211 sorts the extracted selected data icons in order, and generates the group icons 1601 shown in FIG. 16. It should be noted that if N/M is less than 1, the data icons of all content pieces in the group are displayed. Also, if N/M is not a natural number, N/M is rounded up to the nearest integer.

Figure 18:
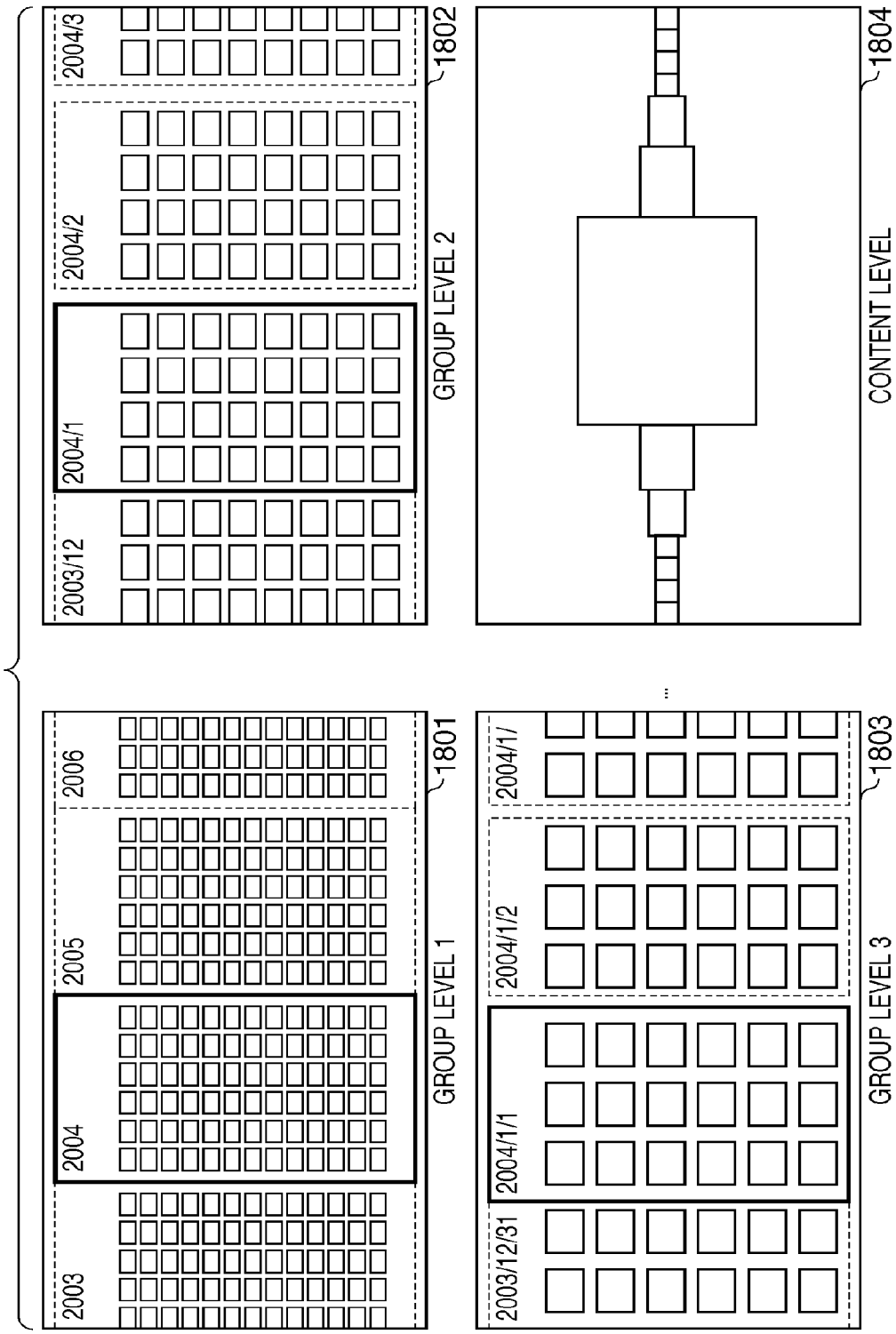
FIG. 18 is a diagram showing an exemplary display of levels according to Embodiment 2.

FIG. 18 shows an exemplary display of the content level and group levels. In FIG. 18, data is grouped hierarchically by year, month, and day as shown in FIG. 22, a year-unit display 1801 is group level 1, a month-unit display 1802 is group level 2, and a day-unit display 1803 is group level 3. FIG. 18 also includes a display 1804 showing the content level. These displays can be switched by operating the level designation keys 1406 to 1409 of the remote controller 102. In the display of group icons in the levels, the most data icons are displayed in the group icons in the year-unit display 1801, the next most data icons are displayed in the group icons shown in the month-unit display 1802, and the fewest data icons are displayed in the group icons shown in the day-unit display 1803. In other words, the higher the level, the more data icons of content in the data group are displayed in the group icon. It should be noted that the number of data icons displayed in a group icon is considered to be set for each level (each group level).

It should also be noted that when shifting to a lower level, among the data groups or content included in the data group indicated by the icon of interest when shifting, the first icon in the array is considered to be the icon of interest. Also, when shifting to a higher level, the icon of the data group including the content or data group indicated by the icon of interest when shifting is considered to be the icon of interest. Furthermore, in the levels, the icon of interest can be shifted by independently scrolling the screen left or right without being taken to a higher level. In other words, the icon of interest can be sequentially changed in accordance with the array order beyond the range of the data group in a higher level including the data or data groups indicated by the icon of interest.

Figure 19:
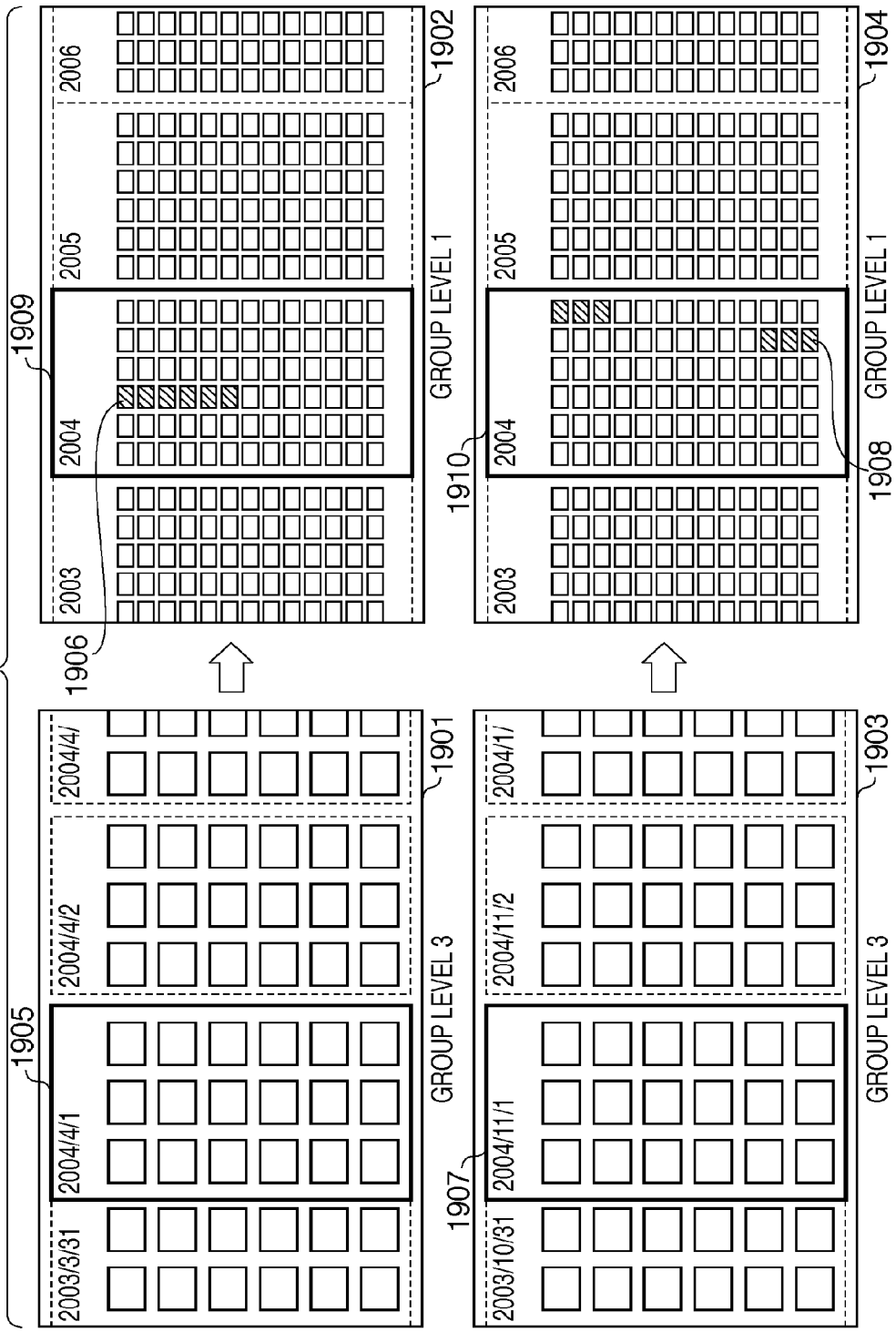
FIG. 19 is a diagram showing an example of display switching according to Embodiment 2.
Figure 20:
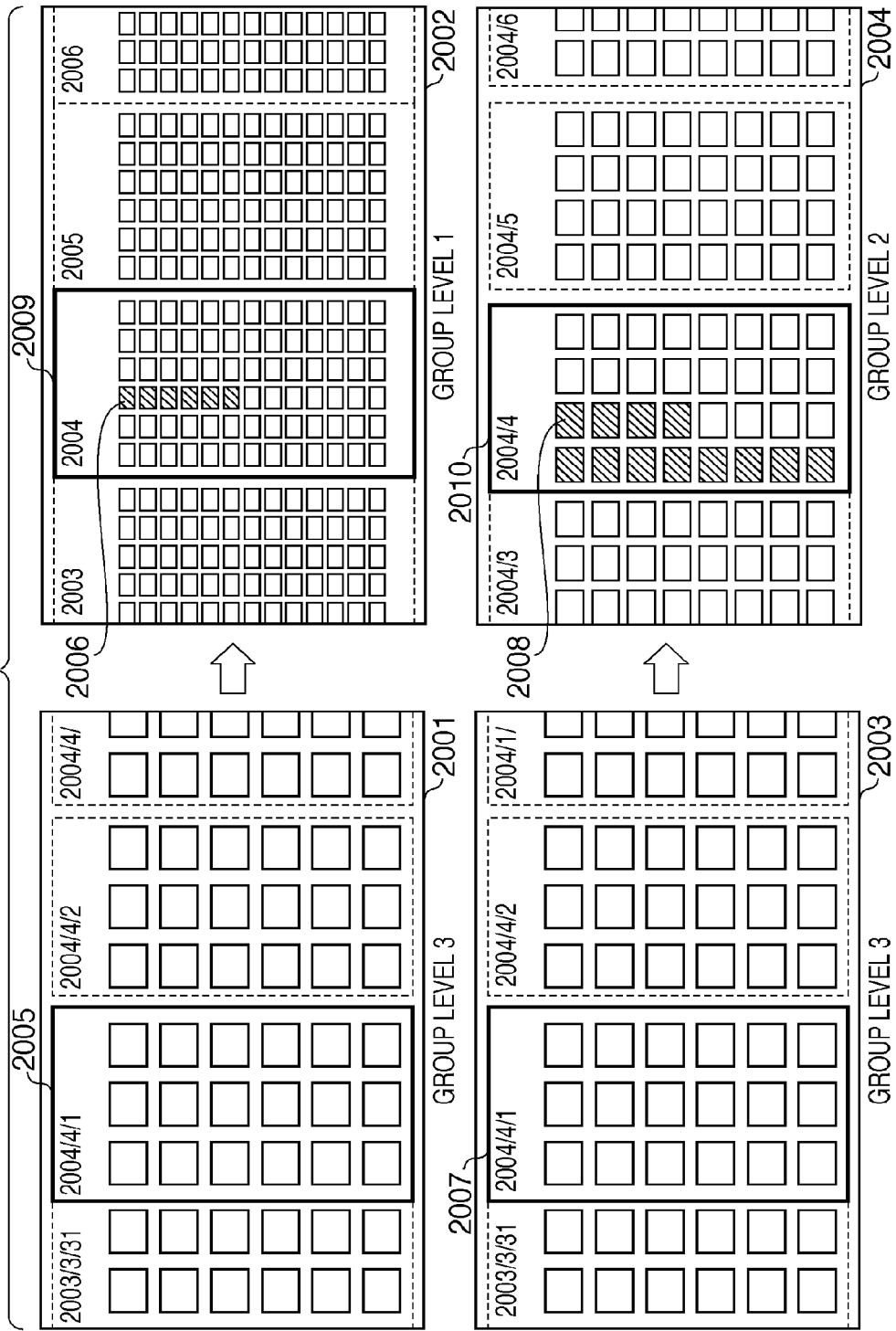
FIG. 20 is a diagram showing an example of display switching according to Embodiment 2.

FIGS. 19, 20, and 21 show examples of switching displays between levels. FIG. 19 shows the case of switching from the group level 3 to the group level 1. In the day-unit (group level 3) display 1901, a group icon 1905 that is the icon of interest shows Apr. 1, 2004. This display is switched to the group level 1 display (a year-unit display 1902). In this case, in the display of a 2004-year group icon 1909, data icons corresponding to the group icon 1905 that was the icon of interest before the switch are displayed as data icons 1906. Here, unlike the other data icons, the data icons 1906 are displayed as data icons having a different background color and are displayed at predetermined positions. Furthermore, the data icons 1906 have been selected from among the data icons displayed in the group icon 1905.

Similarly, in a day-unit display 1903, a group icon 1907 that is the icon of interest shows Nov. 1, 2004. This display is switched to the year-unit group level 1 display 1904. In the display 1904, the icon of interest is a group icon 1910 that indicates the 2004-year data group including the data group indicated by the group icon 1907 that was the icon of interest before the switch. In this case, in the display of the 2004-year group icon 1910, data icons corresponding to the group icon 1907 that was the icon of interest before the switch are displayed as data icons 1908. Here, unlike the other data icons, the data icons 1908 are displayed as data icons having a different background color and are displayed at predetermined positions. Furthermore, the data icons 1908 that are displayed have been selected from among the data icons displayed in the group icon 1907.

A, which is the number of data icons to be displayed as the data icons 1906, is obtained in the following expression.

$$A = C*B/D$$

wherein:
Let B be the number of data pieces included in the data group indicated by the group icon 1905 that was the icon of interest in group level 3;
Let C be the number of data icons displayed in the group icon in group level 1; and
Let D be the number of data pieces in the data group indicated by the group icon 1909 in group level 1.

Specifically, if the level has been switched to a higher level, the number of data icons that are extracted by the group icon generation unit 1311 from the data icons displayed in the icon of interest before the switch is determined based on the ratio of the number of data icons to be displayed in the group icon of the levels before and after the switch. The extracted data icons are then used as data icons constituting the group icon after the switch, and the data icons extracted from the icon of interest are displayed differently from other data icons.

The group icon generation unit 1311 arranges the content pieces in the data groups indicated by the group icons 1905 and 1907 in an array as 1701-1 to 1702-M in FIG. 17, and divides the content pieces into A groups. The group icon generation unit 1311 then extracts the corresponding A data icons 1602 as the selected data icons. In this way, the data icons 1906 and 1908 that are displayed in the icons of interest in group level 1 are extracted from among the data icons displayed in the group icons 1905 and 1907 that were the icons of interest, and the data icons 1906 and 1908 are displayed as data icons having a different background color. The data icons 1906 and 1908 are arranged at positions sorted in the array order, and are included in the group icons after switching. It should be noted that for the other data groups in group level 3 as well, data icons that are to be displayed in the group icons of group level 1 are extracted from the data icons constituting the group icons.

According to the above processing, the group icon displayed after the switch enables checking the position and range that were being browsed before the switch (the range and position of the icon of interest before the switch).

FIG. 20 shows the case of switching from the group level 3 to the group level 1, and the case of switching from the group level 3 to the group level 2. In a day-unit display 2001, a group icon 2005 that is the icon of interest shows Apr. 1, 2004. This display is switched to a year-unit group level display 2002. Accordingly, a 2004-year group icon 2009 becomes the icon of interest. In this case, data icons 2006 corresponding to the icon of interest before the switch (group icon 2005) are displayed in the display of the 2004-year group icon 2009. As described in FIG. 19, the data icons 2006 are displayed at predetermined positions and are displayed as data icons having a different background color in order to enable distinguishing them from other data icons. Furthermore, as described above, the data icons 2006 that are displayed have been selected from among the data icons that were displayed in the icon of interest (group icon 2005).

Also, in a day-unit display 2003, a group icon 2007 that is the icon of interest shows Apr. 1, 2004. This display is switched to a month-unit group level display 2004. Accordingly, an April, 2004 group icon 2010 becomes the icon of interest. In this case, data icons 2008 corresponding to the icon of interest before the switch (group icon 2007) are displayed in the display of the April, 2004 group icon 2010. As shown in FIG. 20, the data icons 2008 are displayed at predetermined positions and are displayed as data icons having a different background color in order to enable distinguishing them from other data icons. Furthermore, the data icons 2008 that are displayed have been selected from among the data icons that were displayed in the group icon 2007 that was the icon of interest before the switch.

E, which is the number of data icons 2008 to be displayed in the display 2004, is obtained in the following expression.

$$E = G*F/H$$

wherein:
Let F be the number of data pieces included in the data group corresponding to the group icon 2007 that is the icon of interest in group level 3;
Let G be the number of data icons displayed in the group icon of group level 2; and
Let H be the number of data pieces in the data group indicated by the group icon 2010 in group level 2.

E data pieces are extracted from among F data pieces in the group icon 2007 according to the method described in FIG. 17, and the extracted data pieces are displayed as data icons having a different background color. Furthermore, the extracted data icons are arranged in the data icon array order in the group icon displayed after the switch, and constitute part of the group icon after the switch.

In this way, in the display 2002 and the display 2004, the number of icons that are displayed depends on the level that was switched to, and as a result, it is possible to check the position and range that were being browsed before the switch for each level (level of detail).

FIG. 21 shows the case of switching from the content level to the group level 1, and the case of switching from the group level 3 to the group level 1. In a content-unit display 2101, the icon of interest is considered to be a data icon 2105 of data in the Apr. 1, 2004 group. The content level display 2101 is switched to a group level 1 year-unit display 2102. In this case, a 2004-year group icon 2109 becomes the icon of interest. Then, in the display of the group icon 2109, the data icon corresponding to the data icon 2105 that was the icon of interest before the switch is displayed as a data icon 2106 in FIG. 21. The data icon 2106 is displayed at a predetermined position and is displayed as a data icon having a different background color in order to enable distinguishing it from other data icons. Furthermore, the data that was displayed in the icon of interest (data icon 2105) is displayed in the data icon 2106.

Also, in a group level 3 day-unit display 2103, a group icon 2107 that is the icon of interest shows Nov. 1, 2004. This display is switched to the group level 1 year-unit display 2104. In this case, as described above in FIGS. 19 and 20, a 2004-year group icon 2110 becomes the icon of interest. Then, in the display of the group icon 2110, data icons corresponding to the group icon 2107 that was the icon of interest before the switch are displayed as data icons 2108. The data icons 2108 are displayed at predetermined positions and are displayed as data icons having a different background color in order to enable distinguishing them from other data icons. Furthermore, the data icons 2108 have been selected from among the data icons that were displayed in the group icon 2107 that was the icon of interest before the switch. In this way, when switching from the content level, there is only one data icon 2106 that corresponds to the icon of interest before the switch, and when switching from the group level 3, there is a plurality of data icons 2108 that correspond to the icon of interest before the switch. In other words, the display after the switch differs according to the level displayed before the switch. This therefore enables recognizing the level that was being browsed before the switch (the content level or the group level 3 in FIG. 21).

FIG. 22 shows a conceptual diagram of a data hierarchy. In FIG. 22, reference numerals 2211 to 2212 denote year-unit data groups, reference numerals 2221 to 2224 denote month-unit data groups, and reference numerals 2231 to 2238 denote day-unit data groups. Reference numerals 2241 to 2258 denote content pieces. The content pieces from 2241 to 2242 belong to the day group 2231, and the day data groups from 2231 to 2232 belong to the month data group 2221. Furthermore, the month data groups from 2221 to 2222 belong to the year data group 2211. In this way, data is managed in a hierarchical structure by the data level management unit 1314. In the content level, the icon of interest can shift between 2241 and 2258. Specifically, in accordance with operation input from the operation unit 204, the scroll control unit 1308 sequentially changes the icon of interest in accordance with the data array order beyond the range of the data group in a higher level. Also, the reference group in each group level (group corresponding to the icon of interest) can shift between 2211 and 2212, 2221 and 2224, and 2231 and 2238.

Detailed Description of Operations

The following describes specific operations of the present apparatus in several different cases.

FIGS. 23A and 23B are a flowchart showing a level shifting operation for shifting between the content level and a group level according to the present embodiment.

First, consider that the display is the group level display shown in FIG. 16. In this state, when the right instruction key 303 of the remote controller has been pressed (step S2301), the scroll control unit 1308 scrolls the screen to the left (step S2302). According to this processing, the icon of interest shifts to the right, from the group icon 1601-2 to 1601-3. Also, when the left instruction key 304 of the remote controller has been pressed (step S2303), the scroll control unit 1308 scrolls the screen to the right (step S2304). According to this processing, the icon of interest shifts to the left, from the group icon 1601-2 to 1601-1.

When the level designation key 1409 of the remote controller has been pressed, the display control unit 1309 determines that there has been an instruction to shift to the content level (step S2305). The display control unit 1309 then obtains the first data (content) in the data group indicated by the group icon 1601-2 that was the icon of interest before the switch. The display control unit 1309 then sets a data icon corresponding to the obtained data as the icon of interest (the data icon 1524 in FIG. 15) in the content level (step S2306). Thereafter, the display control unit 1309 switches the display to the content level as shown in FIG. 15 (step S2307).

If the icon of interest shows the desired content (step S2308: YES), browsing ends. It should be noted that in the present embodiment, in step S2308, content corresponding to the icon of interest is displayed if input corresponding to pressing of the OK key 305 has been detected.

On the other hand, if the icon of interest does not show the desired content, the content is searched by scrolling to shift the icon of interest. Specifically, when the right instruction key 303 of the remote controller 102 has been pressed (step S2309), the scroll control unit 1308 shifts the icon of interest to the right, from the data icon 1524 to the data icon 1525, by scrolling the screen to the left (step S2310). Also, when the left instruction key 304 of the remote controller 102 has been pressed (step S2311), the scroll control unit 1308 shifts the icon of interest to the left, from the data icon 1524 to the data icon 1523, by scrolling the screen to the right (step S2312).

Furthermore, when any of the level designation keys 1406-1408 of the remote controller 102 has been pressed (step S2313), the display is switched to the group level display at the designated level as shown in FIG. 16 (step S2314). At this time, as shown in the data icon 2106 of FIG. 21, the display control unit 1309 displays the content indicated by the icon of interest in the group icon to be displayed after the switch, and furthermore displays such content differently from other data icons in the group icon (step S2315). Assuming that the icon of interest shown in FIG. 17 is included in the range 1701-P to 1702-P, the display position of the data icon 2106 in the group icon (FIG. 21) is the position 1602-P in FIG. 16.

Furthermore, the display control unit 1309 determines whether the level designation key 1409 has been pressed without a scroll operation from the right designation key 303 or left designation key 304 of the remote controller 102 (step S2316). If the instruction for shifting to the content level has been given without a scroll operation, the icon of interest (data icon 1524) in FIG. 15 is set as the icon of interest (icon of interest when switching to a group level) in step S2314, and the display is switched to the content level (step S2307). When a scroll instruction has been received in the group level display, processing is repeated from step S2301.

This enables the position of content that was being browsed in the content level to be recognized in the group icon in a higher group level. When shifting to a higher level, the distance from other data can be known from the positional relationship with the data icon displayed in the group icon. It is also possible to freely shift to a desired level, and furthermore, in the case of shifting and then immediately returning to the content level, it is possible to resume browsing from the same position.

FIG. 24 is a flowchart showing a level shifting operation for shifting between different group levels according to the present embodiment.

First, in the group level display shown in FIG. 16, when the right instruction key 303 of the remote controller 102 has been pressed (step S2401), the scroll control unit 1308 scrolls the screen to the left. Accordingly, the icon of interest shifts to the right, from the group icon 1601-2 to the group icon 1601-3 (step S2402). Also, when the left instruction key 304 of the remote controller 102 has been pressed (step S2403), the scroll control unit 1308 scrolls the screen to the right. Accordingly, the icon of interest shifts to the left, from the group icon 1601-2 to the group icon 1601-1 (step S2404).

Furthermore, when any of the level designation keys 1406 to 1408 of the remote controller 102 pertaining to a different group level has been pressed (step S2405), the display control unit 1309 determines whether the shift destination according to the pressed shift key is a lower level. If the shift destination is a lower level, the display control unit 1309 obtains a post-switch data group or data that belongs to the data group indicated by the icon of interest before the switch. The first data among the obtained data group or data is set as the icon of interest after the switch (step S2406). The display control unit 1309 then switches the display to the designated level (group level) (step S2407). For example, in FIG. 22, when switching from the first level to the third level, and when the data group corresponding to the icon of interest is the data group 2211, the icon of interest is set to 2231. Thereafter, processing returns to step S2401. It should be noted that switching from an arbitrary level to an arbitrary level can be performed with use of the level designation keys 1406 to 1409.

Accordingly, in the level that was switched to, it is further possible to shift the icon of interest by scrolling, and search for content. Specifically, when the right instruction key 303 of the remote controller 102 has been pressed (step S2401), the scroll control unit 1308 shifts the icon of interest to the right, from the group icon 1601-2 to the group icon 1601-3, by scrolling the screen to the left (step S2402). Also, when the left instruction key 304 of the remote controller 102 has been pressed (step S2403), the scroll control unit 1308 shifts the icon of interest to the left, from the group icon 1601-2 to the group icon 1601-1, by scrolling the screen to the right (step S2404).

Also, when any of the level designation keys 1406 to 1408 of the remote controller 102 has been pressed, and this is an instruction to shift to a higher level, processing moves from step S2405 to step S2408. The display control unit 1309 switches to the designated group level display as shown in FIG. 16 (step S2408). At this time, the number of data icons that are selected from the data icons displayed in the icon of interest is a number corresponding to the number of data icons to be displayed in the group icon after the switch (step S2409). Depending on the level to be switched to, as shown in the display states of the data icons 2006 and the data icons 2008 in FIG. 20, the display control unit 1309 then displays data icons that were displayed in the icon of interest in the level before the switch in the group icon to be displayed after the switch. In this way, in the group icon, the display control unit 1309 displays the data icons belonging to the group icon that was the icon of interest before the switch so that they are distinguishable from the other data icons (step S2410). Also, the group icon that includes the data icons corresponding to the icon of interest before the switch is set as the icon of interest immediately after the switch.

Furthermore, the display control unit 1309 determines whether, after the display has been switched to a higher level, a shift key for shifting to the pre-shift level on the remote controller 102 has been pressed before a scroll operation has been performed (step S2411). In the case of determining YES, the icon of interest is set to the icon of interest of step S2405, and the display is switched to the designated group level (step S2407). On the other hand, if a scroll instruction has been received in the group level display after the switch, processing is repeated from step S2401.

The above processing enables the range of content that was being browsed in a group level to be recognized in the group icon of a higher group level. When shifting to a higher level, the distance from other data can be known from the positional relationship with the data icon displayed in the group icon. It is also possible to freely shift to a desired level, and furthermore, in the case of shifting and then immediately returning to the original group level, it is possible to resume browsing from the same position.

Although levels are created in date units, such as year, month, and day in the above embodiments, the number of levels may be increased by further adding time units. Also, levels such as country, prefecture, and place name may be created based on location metadata, and levels such as artist, album, and song may be created in the case of music, and such levels may be managed. Furthermore, groups may be created according to the number of content pieces. Shifting up and down between levels is performed as a result of the user changing the number of content pieces in the groups.

Also, although the range and position of content that was being browsed in a previous level are indicated in the group icon of a higher level by displaying the data icons of such content with a different background color, the appearance of such data icons in the display may be changed by adding a frame, changing the size, or the like.

Also, the range and position of content that was being browsed in a previous level may be indicated in the group icon of a higher level by changing the color in which the data icons of such content is displayed according to the original level. This enables clearly knowing which level was previously being browsed after shifting to a higher level.

In the above configurations, when someone is no longer able to know their position in a detailed lower level, the person can go up to a higher level and clearly find out an overview of all data and their position. It is also possible to know how far it is necessary for the person to shift in order to arrive near the desired content. Furthermore, it is possible to determine the range that is currently being checked.

Also, by displaying more data icons in the group icon when going to a higher level, the number of content pieces displayed corresponds to the number of data pieces in the data groups, thereby enabling more clearly understanding an overview of the data.

Also, it is possible to switch the display while freely skipping levels, as well as easily return to the original position and continue performing a visual search. In other words, it is possible to switch from an arbitrary level to an arbitrary level, instead of merely switching between displayed levels in the order of the levels. Instead of gradually changing the level of detail of content groups, it is possible to display content groups at a desired level of detail, thereby enabling switching to a screen having the desired level of detail in a short amount of time.

Furthermore, it is possible to know the range and position that are being checked while effectively using the display screen, and images can be searched for by scrolling this screen.

Therefore according to Embodiment 2, when switching the displayed level, in the display after switching, it is possible to know the position of the data group or data that was selected from the level before the switch, thereby improving operability.

The present invention, embodiments of which have been described above in detail, can be embodied as, for example, a system, an apparatus, a method, a program, or a storage medium. Specifically, the present invention may be applied to a system constituted from a plurality of devices, and may be applied to an apparatus constituted from one device.

It should be noted that the present invention also includes the case in which the functionality of the embodiments described above is achieved by directly or remotely supplying a system or an apparatus with a software program, and by a computer in the system or apparatus reading out and executing the supplied program code. In this case, the supplied program is a computer program corresponding to the flowcharts shown in the figures in the embodiments.

Accordingly, in order to realize the functionality and processing of the present invention with the computer, the program code itself installed in the computer also realizes the present invention. In other words, the present invention also encompasses a computer program for realizing the functionality and processing of the present invention.

In this case, any mode of program, such as object code, a program executed by an interpreter, or script data supplied to an OS, is acceptable, as long as the functionality of the program is provided.

The following are examples of a computer-readable storage medium for supplying the computer program. The examples include a floppy (registered trademark) disk, a hard disk, an optical disk, a magneto-optical disk, an MO, a CD-ROM, a CD-R, a CD-RW, magnetic tape, a nonvolatile memory card, a ROM, and a DVD (DVD-ROM DVD-R, etc.).

Also, one method of supplying the program is a method of connecting to a website on the Internet using the browser of a client computer, and downloading the computer program of the present invention from the website to a recording medium such as a hard disk. In this case, the downloaded program may be a compressed file that includes an auto-install function. Supply of the program can also be realized by splitting the program code constituting the program of the present invention into a plurality of files and downloading the respective files from different websites. In other words, the present invention also encompass a WWW server that allows a plurality of users to download program files for realizing the functionality and processing of the present invention with use of a computer.

Also, the program of the present invention can be distributed to users as an encrypted program stored on a storage medium such as a CD-ROM. In this case, users that satisfy a predetermined condition can be allowed to download decryption key information from a website via the Internet, and the encrypted program can be executed and installed on a computer using the key information.

Also, in addition to the functionality of the embodiments described above being realized by a computer reading out and executing the program, the functionality of the embodiments may be realized by cooperating with an OS or the like that is running on a computer, based on instructions in the program. In this case, the OS or the like performs part or all of the actual processing, and the functionality of the embodiments described above is realized by the processing.

Furthermore, part or all of the functionality of the embodiments described above may be realized by the program read from the recording medium being written to a memory provided in a function expansion board inserted in a computer or a function expansion unit connected to a computer. In this case, after the program has been written to the function expansion board or function expansion unit, a CPU or the like provided in the function expansion board or the function expansion unit performs part or all of the actual processing based on instructions in the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-172645 filed Jul. 1, 2008, and 2008-249129 filed Sep. 26, 2008, which are hereby incorporated by reference herein in their entirety.

What is claimed is:

1. An image processing apparatus comprising:
a CPU coupled to a memory and programmed to provide:
an operation inputter configured to receive an instruction to switch a screen displayed by a display device between a screen in a first display format, in which a plurality of contents are displayed in day-unit groups in accordance with attribute information indicating a date, which is attached to each of the contents, wherein boundaries of the day-unit groups are identifiably displayed, and a screen in a second display format, in which the plurality of contents are displayed in a list and where the plurality of contents are arranged in a display order according to the attribute information wherein the boundaries of the day-unit groups presented in the first display format are not displayed; and
a display output device configured to present, in a case where the operation inputter receives an instruction to switch the screen in the first display format to the screen in the second display format, the list of the plurality of contents such that a content in the list belonging to a group of interest designated by a user among the day-unit groups displayed in the first display format before execution of the switch, is displayed to be distinguishable from other content in the list, wherein a number of contents displayed to be distinguishable from the other content is determined based on a total number of contents belonging to the group of interest.

2. The image processing apparatus according to claim 1, wherein the list that is presented in accordance with the second display format after the execution of the switch includes content belonging to a group other than the group of interest displayed in the first display format before the execution of the switch.

3. The image processing apparatus according to claim 1, wherein the screen presented in accordance with the second display format after the execution of the switch includes content belonging to a group other than the group of interest displayed in accordance with the first display format before the execution of the switch.

4. The image processing apparatus according to claim 1, wherein the operation inputter switches the screen between the screen in the first display format and the screen in the second display format, in accordance with a user's operation input.

5. The image processing apparatus according to claim 1, wherein the display output device presents, in a case where the screen in the first display format is switched to the screen in the second display format by the instruction received by the operation inputter, the list of the plurality of contents such that a content in the list belonging to a group of interest designated by a user in the first display format before execution of the switch, is displayed to be distinguishable from the other content in the list, which exist in the display order before and after the content.

6. The image processing apparatus according to claim 1, wherein, in the screen in the second display format, a plurality of contents belonging to a plurality of day-unit groups are displayed in a list screen, in which thumbnails of the plurality of contents are arranged in matrix.

7. A method of an image processing apparatus, the method comprising steps of:
receiving, by a CPU, an instruction to switch a screen displayed by a display device between a screen in a first display format, in which a plurality of contents are displayed in day-unit groups in accordance with attribute information indicating a date, which is attached to each of the contents, wherein boundaries of the day-unit groups are identifiably displayed, and a screen in a second display format, in which the plurality of contents are displayed in a list and where the plurality of contents are arranged in a display order according to the attribute information wherein the boundaries of the day-unit groups presented in the first display format are not displayed; and
presenting, by the CPU, in a case where the operation inputter receives an instruction to switch the screen in the first display format to the screen in the second display format in the receiving step, the list of the plurality of contents such that a content in the list belonging to a group of interest designated by a user among the day-unit groups displayed in the first display format before execution of the switch, is displayed to be distinguishable from other content in the list, wherein a number of contents displayed to be distinguishable from the other content is determined based on a total number of contents belonging to the group of interest.

* * * * *